United States Patent
Langford et al.

(10) Patent No.: US 11,982,881 B2
(45) Date of Patent: May 14, 2024

(54) ELECTRONIC OPHTHALMIC LENS FOR MEASURING DISTANCE USING ULTRASOUND TIME-OF-FLIGHT

(71) Applicant: Johnson & Johnson Vision Care, Inc., Jacksonville, FL (US)

(72) Inventors: Donald Scott Langford, Melbourne Beach, FL (US); Adam Toner, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 262 days.

(21) Appl. No.: 17/306,712

(22) Filed: May 3, 2021

(65) Prior Publication Data
US 2021/0255486 A1    Aug. 19, 2021

Related U.S. Application Data

(62) Division of application No. 15/975,056, filed on May 9, 2018, now abandoned.

(51) Int. Cl.
*G02C 7/08* (2006.01)
*G01S 7/526* (2006.01)
(Continued)

(52) U.S. Cl.
CPC ............. *G02C 7/083* (2013.01); *G01S 7/526* (2013.01); *G01S 15/08* (2013.01); *G02C 7/04* (2013.01)

(58) Field of Classification Search
None
See application file for complete search history.

(56) References Cited

U.S. PATENT DOCUMENTS 3,781,772 A * 12/1973 Inoue ................. G01S 15/18
                                                    367/901
3,819,961 A *  6/1974 Bourgeois ............ B06B 1/0253
                                                    318/116
(Continued)

FOREIGN PATENT DOCUMENTS

WO   WO-2011067391 A1 *  6/2011 ............... A61B 3/10
WO       2019215632 A2    11/2019

OTHER PUBLICATIONS

Robert E. Stevens, Thomas N. L. Jacoby, Ilinca Ș. Aricescu, Daniel P. Rhodes, "A review of adjustable lenses for head mounted displays," Proc. SPIE 10335, Digital Optical Technologies 2017, 103350Q (Sep. 12, 2017); doi: 10.1117/12.2276677 (Year: 2017).*

(Continued)

*Primary Examiner* — Isam A Alsomiri
*Assistant Examiner* — Jonathan D Armstrong

(57) ABSTRACT

A contact lens having an electronic system is described herein to provide lens accommodation using a distance measurement determined from an ultrasound time of flight signal. In at least one embodiment, the contact lens includes an ultrasound module, a system controller, a timing circuit, and an actuator. In at least one embodiment, the ultrasound module includes at least one transducer configured to emit a sound pressure wave outwardly and receive a reflected sound pressure wave from an object. A timer may track an elapsed time between generation and detection of the sound pressure wave by the at least one transducer to determine the distance to the object. In at least one embodiment, lens accommodation is further achieved using a communication link between a pair of contact lenses to determine a convergence angle based on independent distance measurements generated by each contact lens.

5 Claims, 14 Drawing Sheets

(51) Int. Cl.
  *G01S 15/08* (2006.01)
  *G02C 7/04* (2006.01)

(56) References Cited

U.S. PATENT DOCUMENTS

| | | | | |
|---|---|---|---|---|
| 3,845,473 A * | 10/1974 | Kawashima | ......... | G06F 3/0232 340/12.18 |
| 4,326,273 A * | 4/1982 | Vancha | ......... | G01S 15/18 367/137 |
| 4,327,171 A * | 4/1982 | Poler | ......... | A61F 2/16 216/48 |
| 4,575,373 A * | 3/1986 | Johnson | ......... | A61F 2/1613 623/6.22 |
| 4,596,144 A * | 6/1986 | Panton | ......... | G01F 23/2962 73/620 |
| 5,067,115 A * | 11/1991 | Wada | ......... | G01S 15/931 367/99 |
| 5,121,023 A * | 6/1992 | Abel | ......... | A61C 17/20 310/318 |
| 6,120,460 A * | 9/2000 | Abreu | ......... | A61B 5/1455 600/405 |
| 6,447,449 B1 * | 9/2002 | Fleischman | ......... | A61B 3/16 600/405 |
| 6,579,235 B1 * | 6/2003 | Abita | ......... | A61B 3/16 600/398 |
| 6,749,568 B2 * | 6/2004 | Fleischman | ......... | A61B 3/16 600/405 |
| 7,639,845 B2 * | 12/2009 | Utsunomiya | ......... | A61B 5/14532 382/116 |
| 8,241,574 B2 * | 8/2012 | Burles | ......... | G03H 1/28 600/300 |
| 8,336,387 B2 * | 12/2012 | Tai | ......... | A61B 5/03 73/718 |
| 8,820,934 B1 * | 9/2014 | Ho | ......... | G02C 7/04 351/219 |
| 8,857,981 B2 * | 10/2014 | Pletcher | ......... | G02C 7/04 351/158 |
| 8,870,370 B1 * | 10/2014 | Otis | ......... | A61B 5/14546 351/159.03 |
| 8,960,898 B1 * | 2/2015 | Etzkorn | ......... | G02C 7/049 351/159.03 |
| 8,960,899 B2 * | 2/2015 | Etzkorn | ......... | G02C 7/049 351/159.03 |
| 8,965,478 B2 * | 2/2015 | Liu | ......... | A61B 5/1486 205/792 |
| 8,971,978 B2 * | 3/2015 | Ho | ......... | A61B 5/14551 600/323 |
| 8,979,271 B2 * | 3/2015 | Pletcher | ......... | A61B 5/7221 351/219 |
| 8,985,763 B1 * | 3/2015 | Etzkorn | ......... | G02C 11/00 351/159.73 |
| 8,986,240 B2 * | 3/2015 | Dos Santos | ......... | A61F 9/00781 604/9 |
| 8,989,834 B2 * | 3/2015 | Ho | ......... | A61B 5/6821 600/381 |
| 9,047,512 B2 * | 6/2015 | Otis | ......... | G02C 11/10 |
| 9,063,351 B1 * | 6/2015 | Ho | ......... | A61B 3/18 |
| 9,083,955 B2 * | 7/2015 | Suzui | ......... | H04N 13/296 |
| 9,111,473 B1 * | 8/2015 | Ho | ......... | G06F 3/013 |
| 9,113,829 B2 * | 8/2015 | Etzkorn | ......... | A61B 5/14546 |
| 9,125,721 B2 * | 9/2015 | Field | ......... | A61F 9/00781 |
| 9,155,653 B2 * | 10/2015 | Field | ......... | A61F 9/00781 |
| 9,158,133 B1 * | 10/2015 | Pletcher | ......... | A61B 5/14532 |
| 9,161,712 B2 * | 10/2015 | Etzkorn | ......... | A61B 5/1477 |
| 9,176,332 B1 * | 11/2015 | Etzkorn | ......... | G02C 11/10 |
| 9,184,698 B1 * | 11/2015 | Wiser | ......... | H03B 28/00 |
| 9,351,827 B2 * | 5/2016 | Toner | ......... | A61F 2/1627 |
| 9,612,362 B2 * | 4/2017 | Yun | ......... | G02B 15/143 |
| 9,612,456 B1 * | 4/2017 | Pugh | ......... | G02C 11/10 |
| 10,845,620 B2 * | 11/2020 | Shtukater | ......... | G02C 7/04 |
| 10,881,504 B2 * | 1/2021 | Pinto | ......... | A61F 2/164 |
| 2004/0027536 A1 * | 2/2004 | Blum | ......... | G02C 7/08 351/159.03 |
| 2006/0173497 A1 * | 8/2006 | Mech | ......... | A61N 1/375 607/2 |
| 2006/0232426 A1 * | 10/2006 | Sabeta | ......... | G02C 7/021 340/10.1 |
| 2008/0208335 A1 * | 8/2008 | Blum | ......... | G02C 7/049 623/6.22 |
| 2010/0113901 A1 * | 5/2010 | Zhang | ......... | G02C 7/04 600/319 |
| 2012/0310339 A1 * | 12/2012 | Berge | ......... | G02C 7/085 623/6.22 |
| 2013/0144170 A1 * | 6/2013 | Chang | ......... | A61B 8/10 600/447 |
| 2013/0211285 A1 * | 8/2013 | Fuller | ......... | A61B 5/031 600/561 |
| 2013/0238090 A1 * | 9/2013 | Pugh | ......... | A61F 2/1635 623/6.13 |
| 2014/0098226 A1 * | 4/2014 | Pletcher | ......... | H04N 7/18 382/103 |
| 2015/0148650 A1 * | 5/2015 | Pugh | ......... | G02C 7/04 600/407 |
| 2015/0234204 A1 * | 8/2015 | Havenstrite | ......... | A61B 5/02 351/159.33 |
| 2016/0299354 A1 * | 10/2016 | Shtukater | ......... | G02C 7/04 |
| 2017/0020390 A1 * | 1/2017 | Flitsch | ......... | A61B 5/024 |
| 2017/0020440 A1 * | 1/2017 | Flitsch | ......... | A61B 5/0022 |
| 2017/0020441 A1 * | 1/2017 | Flitsch | ......... | A61B 5/7455 |
| 2017/0031159 A1 * | 2/2017 | Pugh | ......... | G02B 27/0093 |
| 2017/0087014 A1 * | 3/2017 | Potter, Jr. | ......... | A61F 9/00781 |
| 2017/0160432 A1 * | 6/2017 | Havenstrite | ......... | G02B 1/043 |
| 2017/0258577 A1 * | 9/2017 | Pinto | ......... | A61F 2/1602 |
| 2018/0280135 A1 * | 10/2018 | Otts | ......... | G02B 26/005 |
| 2018/0318068 A1 * | 11/2018 | Otts | ......... | A61F 2/1635 |
| 2019/0060055 A1 * | 2/2019 | Kuiper | ......... | G02C 7/085 |
| 2019/0282399 A1 * | 9/2019 | Goetz | ......... | A61B 8/54 |
| 2019/0346692 A1 * | 11/2019 | Langford | ......... | G01S 7/52079 |
| 2019/0353928 A1 * | 11/2019 | Langford | ......... | G02C 7/049 |
| 2019/0353932 A1 * | 11/2019 | Langford | ......... | A61F 2/1624 |
| 2020/0060809 A1 * | 2/2020 | Toner | ......... | A61B 5/7282 |
| 2020/0150454 A1 * | 5/2020 | Shelef | ......... | G02B 27/017 |
| 2020/0159042 A1 * | 5/2020 | Langford | ......... | G02C 7/083 |
| 2020/0159043 A1 * | 5/2020 | Langford | ......... | G02C 7/022 |
| 2020/0159045 A1 * | 5/2020 | Langford | ......... | A61B 8/4427 |
| 2020/0201073 A1 * | 6/2020 | Lemoff | ......... | G02C 7/041 |
| 2020/0201077 A1 * | 6/2020 | Langford | ......... | A61F 2/16 |
| 2020/0333630 A1 * | 10/2020 | Toner | ......... | G02C 7/04 |

OTHER PUBLICATIONS

International Search Report received for PCT Application No. PCT/IB2019/053776, dated Nov. 15, 2019, 13 Pages.

Invitation to Pay Additional Fee for PCT Application No. PCT/IB2019/053776, dated Sep. 18, 2019, 2 Pages.

* cited by examiner

ELECTRONIC OPHTHALMIC LENS FOR MEASURING DISTANCE USING ULTRASOUND TIME-OF-FLIGHT

CLAIM OF PRIORITY

This application is a divisional of U.S. patent application Ser. No. 15/975,056 filed May 9, 2018.

BACKGROUND OF THE INVENTION

Field of the Invention

The present invention relates to a powered or electronic ophthalmic lens, and more particularly, to a powered or electronic ophthalmic lens having an ultrasound module to provide a distance measurement for lens accommodation, based on the time-of-flight of an emitted/reflected ultrasound signal. The powered or electronic ophthalmic lens further includes a communication link between two ophthalmic lenses. Ophthalmic lenses include contact lenses and intraocular lenses.

Discussion of the Related Art

As electronic devices continue to be miniaturized, it is becoming increasingly more likely to create wearable or embeddable microelectronic devices for a variety of uses. Such uses may include monitoring aspects of body chemistry, administering controlled dosages of medications or therapeutic agents via various mechanisms, including automatically, in response to measurements, or in response to external control signals, and augmenting the performance of organs or tissues. Examples of such devices include glucose infusion pumps, pacemakers, defibrillators, ventricular assist devices and neurostimulators. A new, particularly useful field of application is in ophthalmic wearable lenses and contact lenses. For example, a wearable lens may incorporate a lens assembly having an electronically adjustable focus to augment or enhance performance of the eye. In another example, either with or without adjustable focus, a wearable contact lens may incorporate electronic sensors to detect concentrations of particular chemicals in the precorneal (tear) film. The use of embedded electronics in a lens assembly introduces a potential requirement for communication with the electronics, for a method of powering and/or re-energizing the electronics, for interconnecting the electronics, for internal and external sensing and/or monitoring, and for control of the electronics and the overall function of the lens.

The human eye has the ability to discern millions of colors, adjust easily to shifting light conditions, and transmit signals or information to the brain at a rate exceeding that of a high-speed internet connection. Lenses, such as contact lenses and intraocular lenses, currently are utilized to correct vision defects such as myopia (nearsightedness), hyperopia (farsightedness), presbyopia and astigmatism. However, properly designed lenses incorporating additional components may be utilized to enhance vision as well as to correct vision defects.

Conventional contact lenses are polymeric structures with specific shapes to correct various vision problems as briefly set forth above. To achieve enhanced functionality, various circuits and components have to be integrated into these polymeric structures. For example, control circuits, microprocessors, communication devices, power supplies, sensors, actuators, light-emitting diodes, and miniature antennas may be integrated into contact lenses via custom-built optoelectronic components to not only correct vision, but to enhance vision as well as provide additional functionality as is explained herein. Electronic and/or powered ophthalmic lenses may be designed to provide enhanced vision via zoom-in and zoom-out capabilities, or just simply modifying the refractive capabilities of the lenses. Electronic and/or powered contact lenses may be designed to enhance color and resolution.

The proper combination of devices could yield potentially unlimited functionality; however, there are a number of difficulties associated with the incorporation of extra components on a piece of optical-grade polymer. In general, it is difficult to manufacture such components directly on the lens for a number of reasons, as well as mounting and interconnecting planar devices on a non-planar surface. It is also difficult to manufacture to scale. The components to be placed on or in the lens need to be miniaturized and integrated onto just 1.5 square centimeters of a transparent polymer while protecting the components from the liquid environment on the eye. It is also difficult to make a contact lens comfortable and safe for the wearer with the added thickness of additional components.

In addition, because of the complexity of the functionality associated with a powered lens and the high level of interaction between all of the components comprising a powered lens, there is a need to coordinate and control the overall operation of the electronics and optics comprising a powered ophthalmic lens. Accordingly, there is a need for a system to control the operation of all of the other components and provide communication between the contact lenses that is safe, low-cost, reliable, has a low rate of power consumption and is scalable for incorporation into an ophthalmic lens. There is also a need for determining a distance to an object from an electronic ophthalmic contact lens to adjust a focus of the contact lens.

There are several scenarios where there is a need for powered contact lenses to communicate during normal operation. Methods of detecting and changing lens state for presbyopia, commonly referred to as accommodation, may require the state of the left and right eye to be shared to determine if the lens focus should be changed. In each case, the independent state of each eye must be communicated so that the system controller can determine the required state of the variable lens actuator. There are other cases where it may enhance the user experience if the lens state (e.g., focus state) is changed in a coordinated fashion, for example, based on a convergence angle between an object and each of the contact lenses.

SUMMARY OF THE INVENTION

The electro active contact lens of the present invention includes a contact lens, a power source, and an electronic module to control the electro-active lens. In particular, the electronic module includes a system controller, a timing circuit, and an ultrasound module for determining a distance to an object based on a time of flight measurement generated in response to an emitted ultrasound signal. The time of flight measurement is compared by at least one of the ultrasound module, the system controller, or a lens accommodation controller to a reference value to determine a reference distance. The reference distance is then used to adjust a focus of the contact lens when the view distance has crossed the reference distance.

In at least one embodiment, an ophthalmic lens system includes: a first ophthalmic lens; and a second ophthalmic lens; each of the first ophthalmic lens and the second ophthalmic lens having: at least one ultrasound module configured to generate a time of flight measurement signal; a system controller electrically connected to the ultrasound module, the system controller configured to activate the ultrasound module using at least one preselected sampling frequency; and a communications module in electrical communication with at least one of the ultrasound module or the system controller, the communications module configured to establish a communications link with the other ophthalmic lens; wherein the communications module of the first ophthalmic lens is in signal communication with the communications module of the second ophthalmic lens during use; wherein the system controller of the first ophthalmic lens receives the time of flight measurement signal generated by at least one ultrasound module on each ophthalmic lens, the time of flight measurement signals defining respective first and second distances to an object from each of the first ophthalmic lens and the second ophthalmic lens, and wherein the respective first and second distances are used by the system controller of the first ophthalmic lens in combination with an ophthalmic lens separation distance to establish a convergence angle for setting an accommodation level of the first ophthalmic lens and the second lens. In a further embodiment, each ophthalmic lens further includes an actuator electrically connected to the system controller on the ophthalmic lens to adjust a focus of the ophthalmic lens based on the accommodation level setting. In a further embodiment to either of the previous embodiments, the system controller on the first ophthalmic lens sets an accommodation level after at least five convergence angles have been established and maintained an angle within a predetermined angle threshold.

In at least one embodiment, an ophthalmic lens includes a timing circuit configured to produce a timing signal; a system controller electrically connected to the timing circuit, the system controller configured to receive the timing signal and initiate an ultrasound time of flight measurement; an actuator electrically connected to the system controller; and an ultrasound module electrically connected to the system controller, the ultrasound module having: at least one transducer configured to emit a sound pressure wave outwardly from the ophthalmic lens and/or receive a reflected sound pressure wave; and a timer configured to track an elapsed time between emission of the sound pressure wave and the first of detection of the reflected sound pressure wave or a time period as measured by the ultrasound module being exceeded; wherein the ultrasound module generates the ultrasound time of flight measurement in response to receipt of an initiation signal from the system controller using the timer. Further to the above embodiments, the actuator includes a lens accommodation controller electrically connected to the system controller, the lens accommodation controller configured to initiate an accommodation based on the ultrasound time of flight measurement. Further to the previous embodiment, the actuator further includes a lens driver electrically connected to the lens accommodation controller, the lens driver adjusts a focus of the ophthalmic lens in response to a signal from the lens accommodation controller.

Further to the previous embodiments, the lens accommodation controller is configured to compare the ultrasound time of flight measurement to at least one reference time period to establish a distance defined by at least one of a preset value, a calibrated value, or a target processing value to set an accommodation. Further to the previous embodiments, the ultrasound module is configured to compare the ultrasound time of flight measurement to a reference time period to establish a distance defined by at least one of a preset value, a calibrated value, or a target processing value to set an accommodation. Further to the previous embodiments, the system controller is configured to compare the ultrasound time of flight measurement to a reference time period to establish a distance defined by at least one of a preset value, a calibrated value, or a target processing value to set an accommodation.

Further to the previous embodiments, the timer includes a resettable counter, the resettable counter configured to be reset to zero upon initiation of the ultrasound time of flight measurement by the system controller.

Further to the prior embodiments, the ultrasound module further includes: a digital signal processor including the resettable counter; a switched oscillator having a programmable frequency electrically connected to the digital signal processor; and a burst generator electrically connected to the switched oscillator, the burst generator for gating the switched oscillator for a fixed amount of time to define a burst length, and wherein the resettable counter is configured to count pulses from the switched oscillator to track the elapsed time between output of the sound pressure wave and the first of detection of the reflected sound pressure wave or a time period being exceeded. Further to the previous embodiment, the ultrasound module further includes: a driver electrically connected to the burst generator; a multiplexer having at least one switch, the multiplexer electrically connected to the driver and the at least one transducer; an amplifier electrically connected to the multiplexer; and an analog signal processor electrically connected to the amplifier and the digital signal processor, and wherein the at least one switch is configured to actuate by a generated burst through the driver and enable signal communication between the at least one transducer and the amplifier. Further to the first embodiment in this paragraph, the ultrasound module further includes: a driver electrically connected to the burst generator and the at least one transducer; an amplifier electrically connected to the at least one transducer; and an analog signal processor electrically connected to the amplifier and the digital signal processor, and wherein the amplifier and the analog signal processor are configured to at least one of: activate at a select time after the at least one transducer outputs the sound pressure wave, or activate at the same time as the at least one transducer outputs the sound pressure wave and the digital signal processor is configured to initiate a lock out period to reduce false detection by the ultrasound module of extraneous sound pressure waves. Further to the previous embodiment, the analog signal processor is configured to transmit a reflected sound pressure wave detection signal to the digital signal processor; and wherein the digital signal processor stops counting the pulses from the switched oscillator upon the first of receiving the reflected sound pressure wave detection signal or the time period being exceeded. Further to the previous embodiment, the at least one output from the digital signal processor is provided to the system controller to initiate a lens accommodation. Further to the previous two embodiments, the analog signal processor includes at least one of a frequency selective filter, an envelop detector, an integrator, a level comparator, or an analog-to-digital converter.

Further to the previous embodiments, the actuator includes an alert mechanism, and wherein the system controller is configured to send an initiation signal to the actuator in response to proximity of an object in front of a wearer of the ophthalmic lens.

In at least one embodiment, a method for operation of a first ophthalmic lens and a second ophthalmic lens, each of the first ophthalmic lens and the second ophthalmic lens including an ultrasound module, a system controller, a communications module, and an actuator, the method including: generating the first and second time measurement signals respectively by the ultrasound modules of each ophthalmic lens; transmitting the first and second time measurement signals to the system controller of the second ophthalmic lens; establishing respective first and second distances to an object from each of the ophthalmic lenses using the first and second time measurement signals by the system controller of the second ophthalmic lens; calculating a convergence angle using a ophthalmic lens separation distance and the respective first and second distances to the object by the system controller of the second ophthalmic lens; comparing the convergence angle to a reference convergence angle to establish an accommodation level; and initiating the actuators to adjust a focus of the ophthalmic lenses when the accommodation level is different than a current accommodation level of the ophthalmic lenses. Further to the previous embodiment, the method further including repeating generating, transmitting, establishing, and calculating a plurality of times to confirm that the convergence angle remains within a predefined range prior to comparing the convergence angle and initiating the actuators. Further to the previous method embodiments, the method further including calibrating the reference convergence angle of the ophthalmic lenses based on the first and second distances to an object held during the calibration of the first ophthalmic lens and the second ophthalmic lens.

Further to the previous embodiments, the ophthalmic lens includes an intraocular lens and/or a contact lens.

Further to any of the embodiments above, a message sent by the system controller of the first ophthalmic lens uses a predefined protocol. Further to any of the embodiments above, the message sent by the system controller of the first ophthalmic lens includes instructions for the second ophthalmic lens to perform a predefined function. Further to any of the embodiments above, the message sent by the system controller of the first ophthalmic lens includes sensor readings from at least one sensor and/or distance information obtained by the ultrasound module on the first ophthalmic lens.

BRIEF DESCRIPTION OF THE DRAWINGS

The foregoing and other features and advantages of the invention will be apparent from the following, more particular description of preferred embodiments of the invention, as illustrated in the accompanying drawings.

DETAILED DESCRIPTION OF THE EMBODIMENTS

Figure 1:
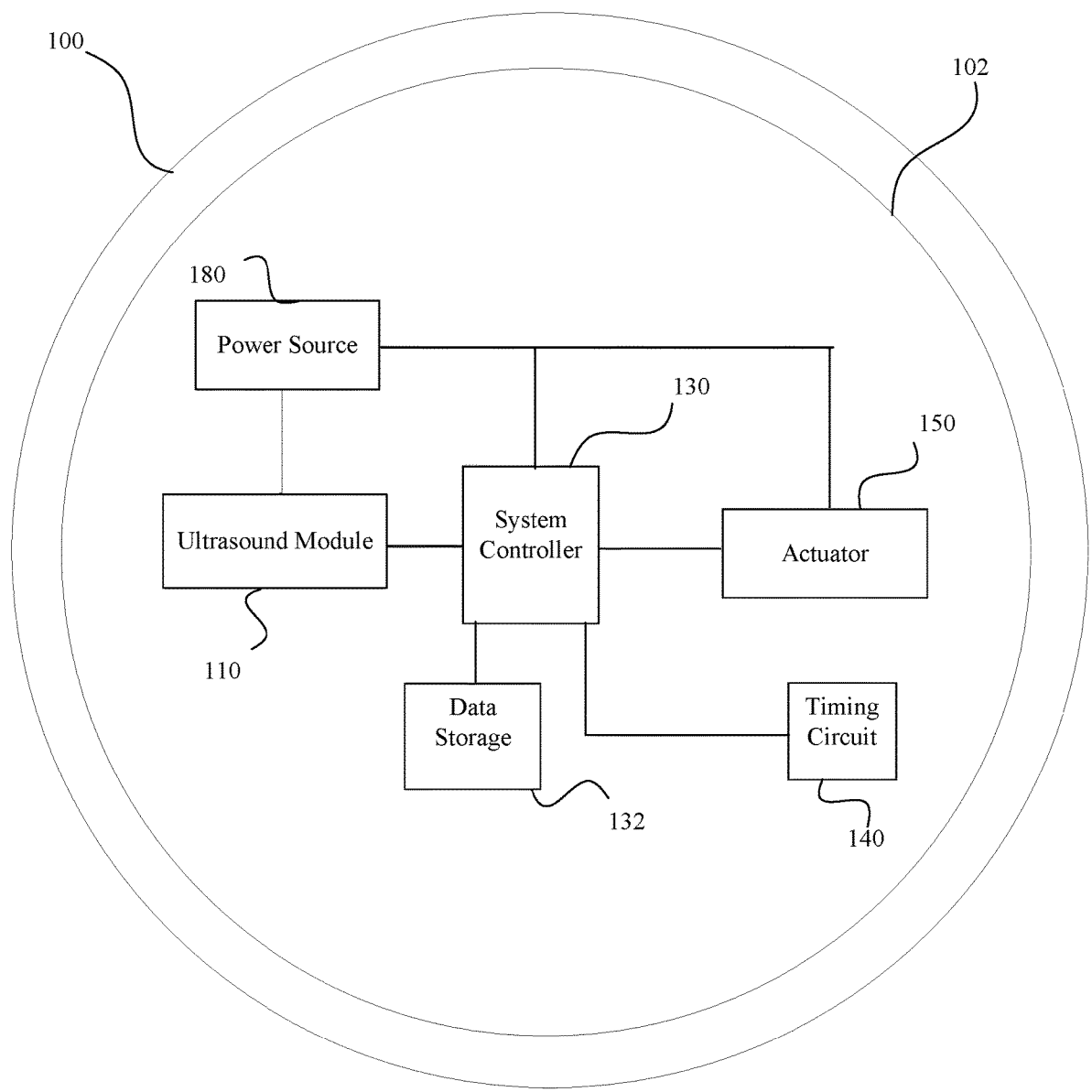
FIG. 1 illustrates a contact lens having at least one ultrasound module in accordance with at least one embodiment of the present invention.

Conventional contact lenses are polymeric structures with specific shapes to correct various vision problems as briefly set forth above. To achieve enhanced functionality, various circuits and components may be integrated into these polymeric structures. For example, control circuits, microprocessors, communication devices, power supplies, sensors, ultrasound modules, and miniature antennas may be integrated into contact lenses via custom-built optoelectronic components to not only correct vision, but to enhance vision as well as provide additional functionality as is explained herein. Electronic and/or powered contact lenses may be designed to provide enhanced vision via zoom-in and zoom-out capabilities, or just simply modifying the refractive capabilities of the lenses. Electronic and/or powered contact lenses may be designed to enhance color and resolution. In at least one embodiment, the ultrasound module is used to determine a distance to an object being viewed. In addition, ultrasound modules built into the lenses may be utilized to communicate with other lenses or external devices.

The powered or electronic contact lens in at least one embodiment includes the necessary elements to monitor the wearer with or without elements to correct and/or enhance the vision of the wearer with one or more of the above described vision defects or otherwise perform a useful ophthalmic function. The electronic contact lens may have a variable-focus optic lens, an assembled front optic embedded into a contact lens or just simply embedding electronics without a lens for any suitable functionality. The electronic lens of the present invention may be incorporated into any number of contact lenses as described above. In addition, intraocular lenses may also incorporate the various components and functionality described herein. However, for ease of explanation, the disclosure will focus on an electronic contact lens intended for single-use daily disposability.

The present invention may be employed in a powered ophthalmic lens or powered contact lens having an electronic system, which actuates a variable-focus optic or any other device or devices configured to implement any number of functions that may be performed. An ophthalmic lens includes a contact lens and an intraocular lens. The electronic system includes one or more batteries or other power sources, power management circuitry, one or more sensors, clock generation circuitry, control algorithms and circuitry, and lens driver circuitry. The complexity of these components may vary depending on the required or desired functionality of the lens.

Control of an electronic or a powered ophthalmic lens may be accomplished through a manually operated external device that communicates with the lens through radio frequency and/or ultrasonic communication, such as a handheld remote unit, a phone, a storage container, spectacles, glasses, or a cleaning box. For example, an external device may wirelessly communicate using ultrasound with the powered lens based upon manual input from the wearer. Alternatively, control of the powered ophthalmic lens may be accomplished via feedback or control signals directly from the wearer.

Because of the complexity of the functionality associated with a powered lens and the high level of interaction between all of the components comprising a powered lens, there is a need to coordinate and control the overall operation of the electronics and optics comprising a powered ophthalmic lens. Accordingly, there is a need for a system to control the operation of all of the other components and potentially provide communication between the contact lenses that is low-cost and reliable, has a low rate of power consumption, and is scalable for incorporation into an ophthalmic lens.

According to at least one embodiment, the optics of the ophthalmic lenses may be adjusted based on a distance from the person wearing (or using) the ophthalmic lenses to an object being viewed. One approach to find the distance is by producing with a transmit ultrasound transducer a sound pressure wave into the field of view. In at least one embodiment, the sound pressure wave includes a burst or multiple sound pressure waves. Objects in the field of view will reflect and/or scatter the sound pressure wave. There is a finite amount of time that passes between the generation of the transmitted sound pressure wave and the return of the reflected signal. This time is determined by the speed of sound in air (typically 343 meters/second) and two times the distance to the object. Two times the distance to the object is used to account for the initial time it takes the sound pressure wave to travel from the transmit ultrasound transducer to the object and the time it takes the reflected wave to travel back to the receive ultrasound transducer. In at least one embodiment, the sound pressure wave is used for communication.

FIGS. 1-9 and 13 illustrate different exemplary embodiments according to the invention that include a system controller 130 connected to a timing circuit 140 and an ultrasound module (collectively referred to as 110) that are on a contact lens 100. The ultrasound module 110 may take a variety of forms including distinct transmit and receive transducers or a shared transmit/receive transducer as illustrated, for example, in FIGS. 4-9. Depending on a particular implementation, there may be multiple ultrasound modules 110 present on the contact lens to facilitate particular functionality for the contact lens or alternatively multiple transducers connected to or more ultrasound modules. Many of the figures include an actuator 150 as part of the system with the actuator 150 being representative of, for example, lens accommodation components, data collection components, data monitoring components, and/or functional components such as an alarm.

The system controller 130 in at least one embodiment uses at least one predetermined threshold for interpreting the output of the ultrasound module 110. In at least one embodiment as illustrated in FIG. 1, the system controller 130 is in electrical communication with a data storage module 132 that stores the threshold(s). Examples of data storage 132 include memory such as persistent or non-volatile memory, volatile memory, and buffer memory, a register(s), a cache (s), programmable read-only memory (PROM), programmable erasable memory, magneto resistive random access memory (RAM), ferro-electric RAM, flash memory, and polymer thin film ferroelectric memory. In an alternative embodiment, the output(s) of the ultrasound module 110 to the system controller 130 is converted by the system controller 130 into data for control of the actuator 150. In an alternative embodiment, the system controller 130 interprets the output of the ultrasound module 110 using a predefined protocol. In an alternative embodiment, the threshold is replaced by a template to facilitate ultrasound communication, for example, between the contact lenses and/or with an external device.

In at least one embodiment, a timing circuit 140 provides a timing signal to the system controller 130, which initiates a time-of-flight measurement at time intervals, which in at least one embodiment are predetermined or pursuant to a particular sampling rate. In other embodiments, the timing circuit 140 is omitted and the function is provided by the system controller 130. In an alternative embodiment, the time intervals are variable to allow for the sampling to be adjusted when the ultrasound modules 110 return a signal indicating that there has been a change in range to the object being viewed and/or when the time of flight is indicating that the wearer is viewing an object that is close-up, for example, when the wearer is reading a book or instruments. In further embodiments, the time intervals are dependent upon the mode in which the contact lens is operating. In at least one embodiment, when the ultrasound module 110 receives an initiation signal from the system controller 130, the ultrasound module 110 will begin a count to correspond to the transmission of a sound pressure wave by the at least one transducer in the ultrasound module 110 into a field of view for the contact lens wearer. The time between transmission of the sound pressure wave and receipt of a reflected sound pressure wave by at least one transducer in the ultrasound module 110 will provide a time of flight measurement. The time of flight measurement can be converted into a distance based on the speed of sound in air, which typically is 343 meters/second, so the time period would be twice the distance to the inflection point. Alternatively, the contact lens 100 may use the time measurement for its processing.

In at least one embodiment, the ultrasound module 110 will determine that the wearer is viewing an object beyond the threshold for changing the accommodation level when a time period expires where the time period is associated with a distance to an accommodation threshold distance for adjusting the accommodation level. In at least one embodiment, the accommodation threshold distance is at two different distances for the accommodation level change to delay the switch and to provide a certain amount of hysteresis, which may also be accomplished by requiring for a predetermined number of readings showing a change before the accommodation level is changed. In a further embodiment to the above embodiments, the ultrasound module 110 uses a lockout period to avoid the detection of a reflected sound pressure wave, for example, from the wearer's eyelid or glasses worn by the wearer.

In at least one embodiment, the output signal from the ultrasound module 110 to the system controller 130 will be used by the system controller 130 to adjust the accommodation level of the contact lens 100 through an actuator 150. In such an embodiment, the system controller 130 may provide for the hysteresis analysis to avoid an incorrect change in the accommodation level. In an alternative embodiment, the output signal may be a time measurement, a distance, or an indicator as to range to the object being viewed that can be used by the system controller 130 to determine if there has been a change in viewing distance and thus a need to adjust the accommodation level. In at least one embodiment, the actuator 150 includes a lens driver to change the accommodation level provided by the contact lens.

In at least one embodiment, there is communication between a pair of contact lenses 100, 100 to confirm the accommodation level being used by the respective contact lenses 100, 100. The communication between the contact lenses 100 may occur through a communication channel such as a radio frequency transmission or an ultrasound transmission between the contact lenses or through an external device acting as a relay and/or a source of additional processing power.

FIG. 1 illustrates a system on a contact lens 100 having an electro-active region 102 with an ultrasound module 110, a system controller 130, a timing circuit 140, an actuator 150, and a power source 180. In at least one further embodiment, the electro-active region 102 includes an electronics ring around the contact lens 100 on which the electronics are located. The ultrasound module 110 in at least one embodiment has two-way communication with the system controller 130. The actuator 150 receives an output from the system controller 130. In at least one alternative embodiment, the actuator 150 is omitted from one or more of the illustrated embodiments in this disclosure.

The actuator 150 may include any suitable device for implementing a specific function based upon a received command signal from the system controller 130. For example, if a set of data samples is less than/greater than a threshold, the system controller 130 may enable the actuator 150 to change focus of the contact lens, provide an alert to the wearer such as a light (or light array) to pulse a light or cause a physical wave to pulsate into the wearer's retina (or alternatively across the lens), or to log data regarding the state of the wearer. Further examples of the actuator 150 acting as an alert mechanism include an electrical device; a mechanical device including, for example, piezoelectric devices, transducers, vibrational devices, chemical release devices with examples including the release of chemicals to cause an itching, irritation or burning sensation, and acoustic devices; a transducer providing optic zone modification of an optic zone of the contact lens such as modifying the focus and/or percentage of light transmission through the lens; a magnetic device; an electromagnetic device; a thermal device; an optical coloration mechanism with or without liquid crystal, prisms, fiber optics, and/or light tubes to, for example, provide an optic modification and/or direct light towards the retina; an electrical device such as an electrical stimulator to provide a mild retinal stimulation or to stimulate at least one of a corneal surface and one or more sensory nerves of the cornea; or any combination thereof. In an alternative embodiment, the actuator 150 sends an alert to an external device using, for example, the ultrasound module 110. The actuator 150 receives a signal from the system controller 130 in addition to power from the power source 180 and produces some action based on the signal from the system controller 130. For example, if the output signal from the system controller 130 occurs during one operation state, then the actuator 150 may alert the wearer that a medical condition has arisen or the contact lens is ending/nearing its useful life and/or defective. In an alternative embodiment, the actuator 150 delivers a pharmaceutical product to the wearer in response to an instruction from the system controller 130. In an alternative embodiment, the output signal from the system controller 130 during another operation state, then the actuator 150 will record the information in memory for later retrieval. In a still further alternative embodiment, the signal will cause the actuator to alarm and store information. In another alternative embodiment, the actuator includes the alert mechanism that is triggered when the contact lens wearer approaches an object to provide a proximity alarm to the wearer, who in such a situation may have some reduce visual acuity, that can be triggered based upon the time of flight measurement. In an alternative embodiment, the system controller 130 stores the data in the memory (e.g., data storage 132 in other embodiments) associated with the system controller 130 and does not use the actuator 150 for data storage and in at least one embodiment, the actuator 150 is omitted. As set forth above, the powered lens of the present invention may provide various functionality; accordingly, one or more actuators may be variously configured to implement the functionality.

FIG. 1 also illustrates a power source 180, which supplies power for numerous components in the system. The power may be supplied from a battery, energy harvester, or other suitable means as is known to one of ordinary skill in the art. Essentially, any type of power source 180 may be utilized to provide reliable power for all other components of the system. In an alternative embodiment, communication functionality is provided by an energy harvester that acts as the receiver for the time signal, for example, in an alternative embodiment, the energy harvester is a photovoltaic cell (in a contact lens embodiment), a photodiode(s) (in a contact lens embodiment), or a radio frequency (RF) receiver, which receives both power and a time-base signal (or indication). In a further alternative embodiment, the energy harvester is an inductive charger, in which power is transferred in addition to data such as RFID. In one or more of these alternative embodiments, the time signal could be inherent in the harvested energy, for example, N*60 Hz in inductive charging, lighting, or sound including ultrasound.

Figure 2:
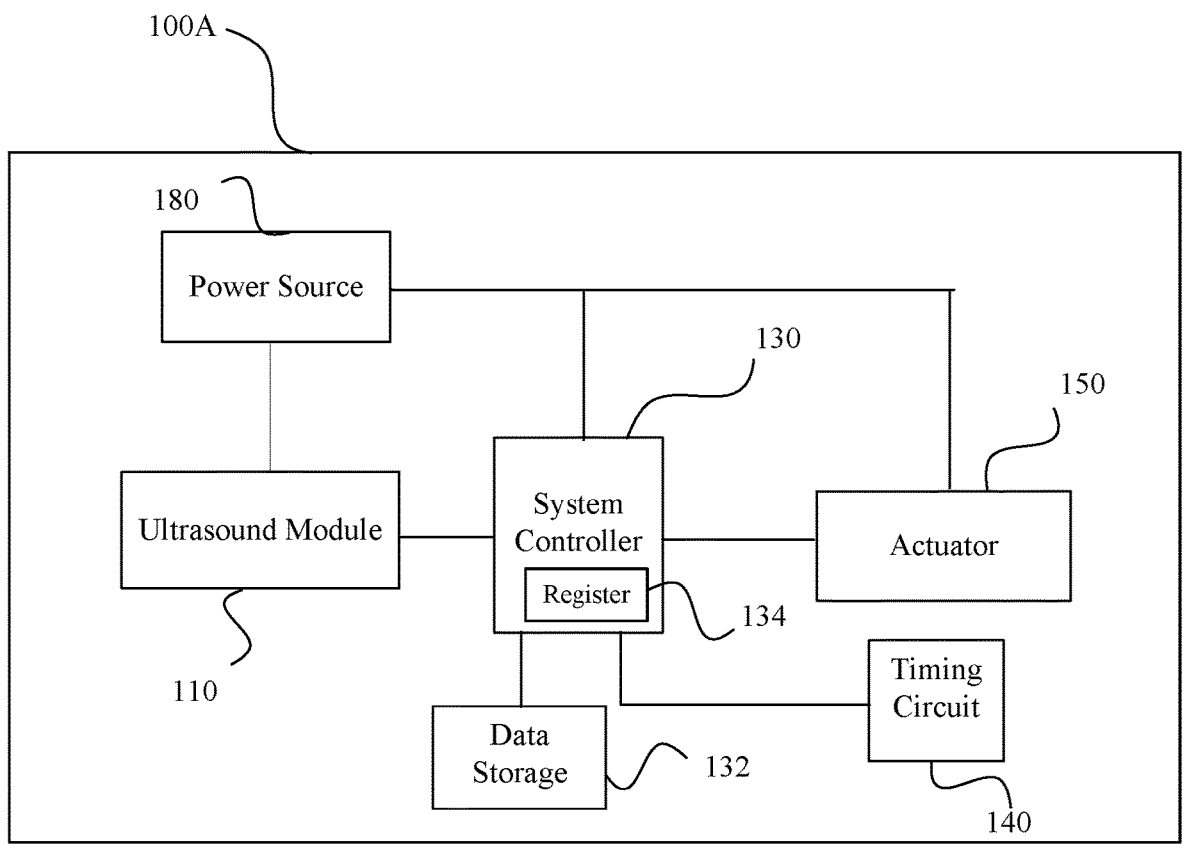
FIG. 2 illustrates a contact lens having at least one ultrasound module and a system controller having a register in accordance with at least one embodiment of the present invention.

In at least one embodiment as illustrated in FIG. 2, the contact lens 100A includes the system controller 130 having a register 134 for storing data samples from the ultrasound module 110. In a further embodiment, there is an individual register 134 for each ultrasound module 110 and/or receiving transducer present on the contact lens 100A. The use of a register in at least one embodiment allows for the comparison of data with prior data, a threshold, a preset value, a calibrated value, or a target processing value. In an alternative embodiment, other data storage is used instead of a register(s). In an alternative embodiment, the register 134 is part of the data storage 132.

Based on this disclosure, it should be appreciated that in addition to the presence of the ultrasound module 110 on the contact lens 100 that additional sensors may be included as part of the contact lens to monitor characteristics of the eye and/or the lens. In at least one embodiment, at least a portion of the actuator 150 is consolidated with the system controller 130.

Figure 3:
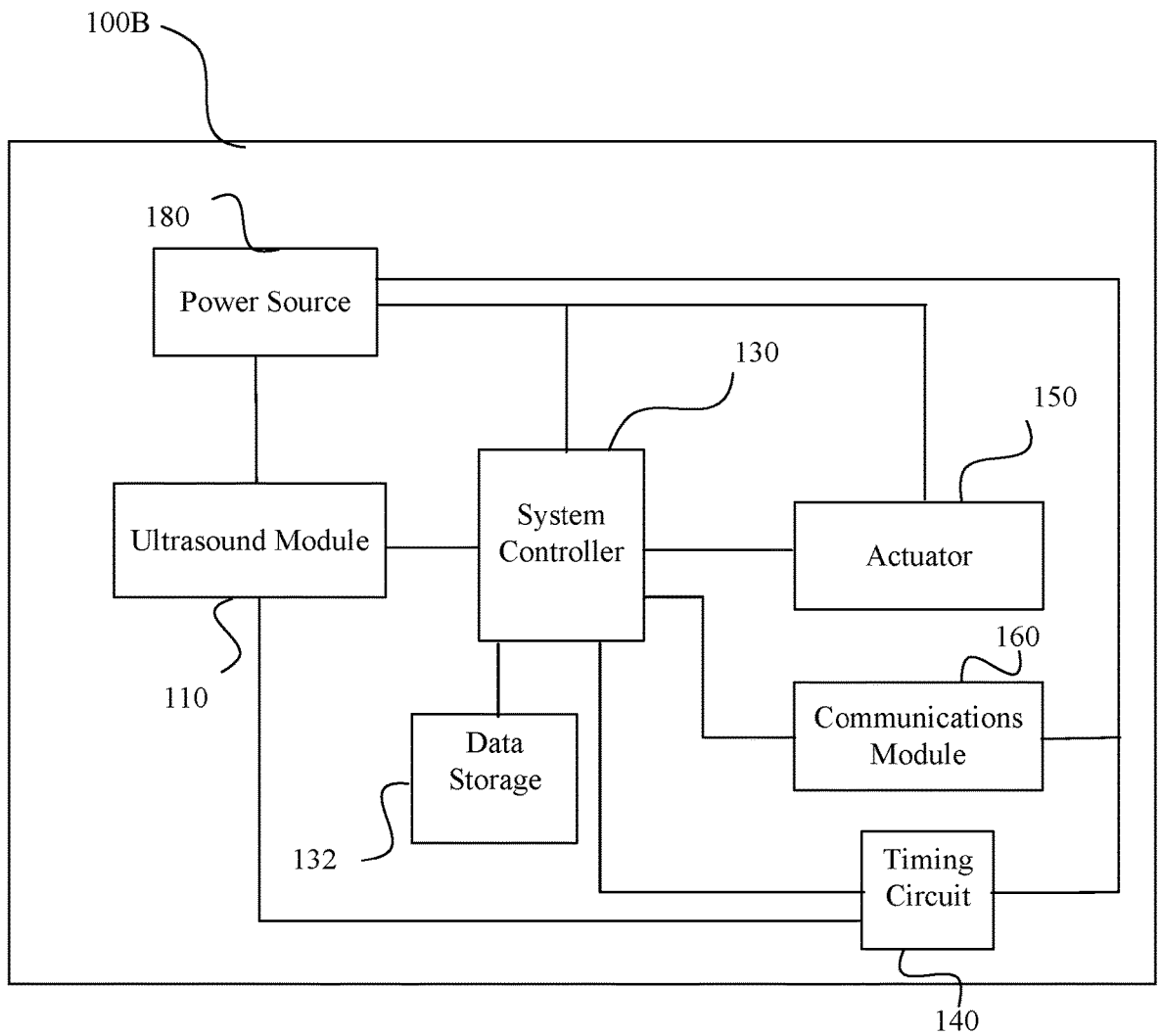
FIG. 3 illustrates a contact lens having at least one ultrasound module and a timing circuit in accordance with at least one embodiment of the present invention.

FIG. 3 illustrates another contact lens 100B that illustrates an example of the timing circuit 140 being connected to the power source 180 and/or the ultrasound module 110. When the timing circuit 140 is connected to the ultrasound module 110, the timing circuit 140 provides a timing signal to the ultrasound module 110 thus allowing the timing components to be omitted from the ultrasound module 110. The timing circuit 140 provides a clock function for operation of the contact lens. As illustrated the timing circuit 140 is connected to the system controller 130. In at least one embodiment, the timing circuit 140 drives the system controller 130 to send a signal to the ultrasound module 110 to perform a function based on a sampling time interval, which in at least one embodiment is variable based on the output from the ultrasound module 110 to the system controller 130. In an alternative embodiment, the timing circuit 140 is part of the system controller 130.

FIG. 3 also illustrates an example of how the contact lenses 100 may include a communications module 160. Having a communications module 160 in each contact lens being worn (or used) by a user permits two-way communication to take place between the contact lenses. The communications module 160 may include transmitters, receivers, radio frequency (RF) transceivers, antennas, interface circuitry for photosensors, and associated or similar electronic components. A communication channel (or link) between the contact lenses may include RF transmissions at the appropriate frequency and power with an appropriate data protocol to permit effective communication between the contact lenses. The communications module 160 may be configured for two-way communication with the system controller 130. The communications module 160 may contain filtering, amplification, detection, and processing circuitry as is common for establishing a communications link. In an embodiment involving RF, the communications module 160 would be tailored for an electronic or powered contact lens, for example, the communication may be at the appropriate frequency, amplitude, and format for reliable communication between eyes, low power consumption, and to meet regulatory requirements. The communications module 160 may work in the RF bands, for example, 2.4 GHz, or may use light for communication. Information received by the communications module 160 is input to the system controller 130. The system controller 130 may also transmit data from, for example, the ultrasound module 110, to the communications module 160, which then transmits data over the communication link to the other contact lens or possibly an external device. In an alternative embodiment, the contact lenses use an ultrasound module to establish the communication link between the contact lenses.

FIGS. 4-9 and 13 illustrate different ultrasound modules that illustrate different transmit paths and receive paths examples of paths that facilitate transmitting and receiving sound pressure waves from one or more transducers 116, 121 that start or end with a processor 111 and/or the system controller 130 depending on the example embodiment.

Figure 4:
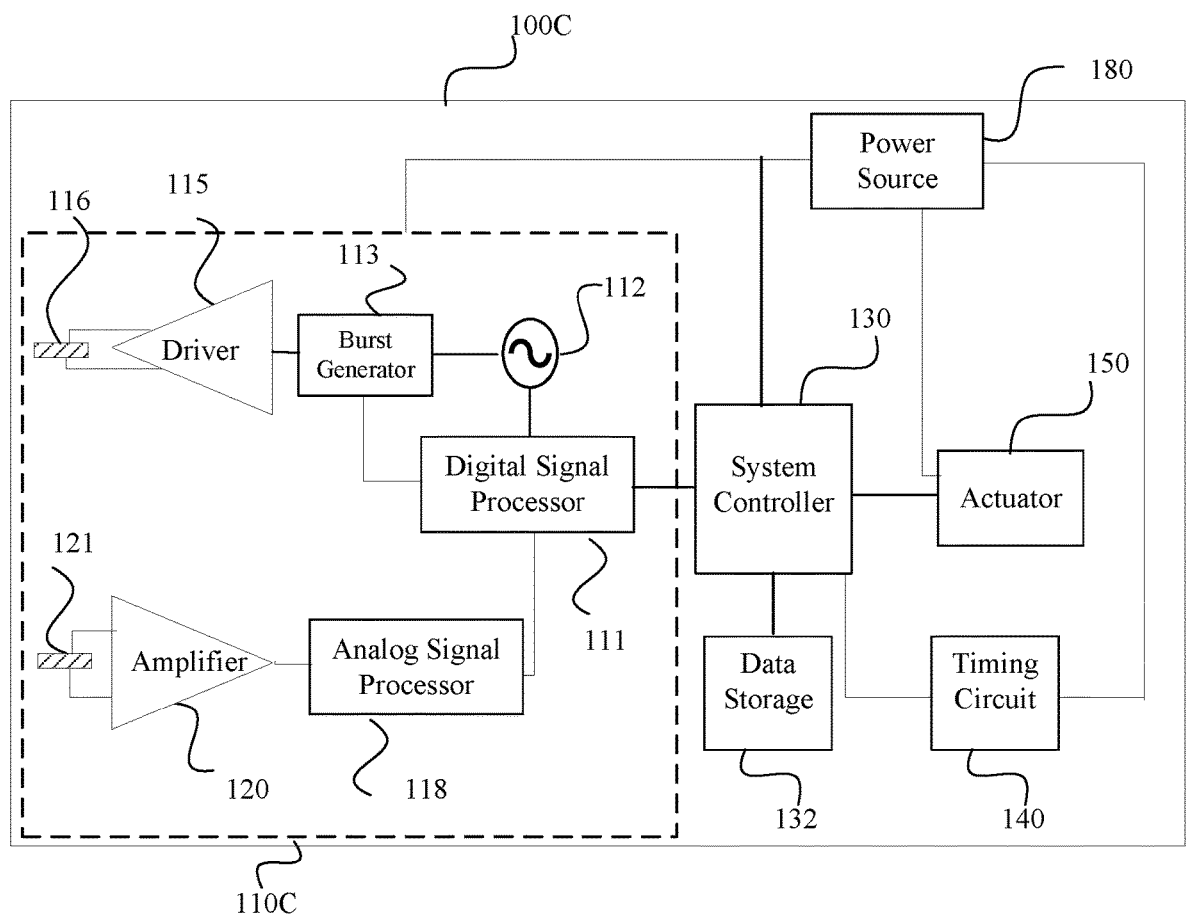
FIG. 4 illustrates an ultrasound module with a transmit transducer and a receive transducer in accordance with at least one embodiment of the present invention.

FIG. 4 illustrates a contact lens 100C that includes an ultrasound module 110C having distinct transmit and receive sides to the ultrasound module 110C. The illustrated ultrasound module 110C includes a digital signal processor 111, an oscillator 112, a burst generator 113, a transmit driver 115, a transmit ultrasound transducer 116, an analog signal processor 118, a receive amplifier 120, and a receive ultrasound transducer 121. In at least one embodiment, the burst generator produces a series of 1's and 0's to facilitate communication with another lens and/or an external device. In at least one embodiment, the burst generator 113 incorporates a unique identifier for the contact lens based on the amplitude, the frequency, the length, and/or the code modulation of the signal. In a further embodiment, the unique identifier is provided by the system controller 130, the digital signal processor 111, the oscillator 112, and/or the burst generator 113. A similar use of a unique identifier may be used with the other embodiments in this disclosure. In at least one alternative embodiment for the ultrasound module 110C, the digital signal processor 111 is combined with the system controller 130. In another alternative embodiment, the analog signal processor 118 is combined with the digital signal processor 111 and/or replaced with an analog-to-digital convertor as illustrated in a later figure. These two alternative embodiments may be combined to provide a further alternative embodiment.

The digital signal processor 111 receives a control signal from the system controller 130. In at least one embodiment, the digital signal processor 111 includes a resettable counter and a time-to-digital convertor and transmit/receive sequencing controls. The oscillator 112 in at least one embodiment is a switched oscillator. In at least one embodiment, the frequency of the oscillator 112 is programmable through a preset oscillator value, the system controller 130 or external interface (e.g., an interface with an external device). The frequency can be tuned using a reference oscillator and an external interface. In at least one further embodiment, the frequency is set or tuned to a value that minimizes transmit and receive electrical power and allows the transmit ultrasound transducer 116 to produce a pressure sound wave that will have maximum amplitude at the receiver input. In a more particular embodiment, the oscillator 112 is a programmable frequency oscillator such as a current starved ring oscillator where the current and the capacitance control the oscillation frequency where the frequency can be altered by changing the current supplied to the oscillator. In at least one embodiment, the wavelength of the sound pressure wave is tuned based on the dimensions of the transducer used. In a further embodiment, the oscillator 112 varies over time for optimal transmission characteristics. In a still further embodiment, the frequency is calibrated using a reference frequency provided through an external interface and an automatic frequency control (AFC) circuit. The frequency is preset with the AFC tuning it. The frequency can be directly set through the serial interface, which is accessed through the external communications link.

In an embodiment where the time of flight is used, the counter in the digital signal processor 111 begins to count pulses output from the oscillator 112. The burst generator 113 gates the oscillator signal for a fixed amount of time defined as the burst length. In at least one embodiment, the burst length is programmable or determined by static timing relationships within the burst generator 113. In at least one embodiment, the counter is a resettable counter.

The output voltage of the burst generator 113 may be level shifted to the appropriate value for the transmit driver 115 and the transmit ultrasound transducer 116. An example of the transmit ultrasound transducer 116 is a piezoelectric device which converts applied burst voltage to a sound pressure burst. In a further embodiment, the transmit ultrasound transducer 116 is made of any piezoelectric material that is compatible with the power source and the physical properties of the contact lens. The sound pressure wave produced by the transmit ultrasound transducer 116 propagates from the contact lens 100C into the field of view. The speed of sound in air typically is 343 meters/second, so in an embodiment that measures time of flight, then the distance to the object can be measured by dividing the travel time between the propagation of the sound pressure wave and receipt of the reflected sound pressure wave by the receive ultrasound transducer 121.

The receive amplifier 120 and the analog signal processor 118 in at least one embodiment are turned on with the oscillator 112 or turned on after a predetermined delay after the oscillator 112 is started. When there is a predetermined delay, power for contact lens operation may be lowered during the period of delay. In an embodiment where the receive amplifier 120 and the analog signal processor 118 are started with the oscillator 112, the receive amplifier 120 will receive an output from the receive ultrasound transducer 121 proximate to when the sound pressure wave is output by the transmit ultrasound transducer 116. This output from the receive ultrasound transducer 121 can be used to reset the counter in the digital signal processor 111. In a further embodiment, the detection of the transmit sound pressure wave can be used as an indicator that a true transmit signal has been generated. In addition, detection of the emitted sound pressure wave may be used as an indicator that an actual sound pressure wave has been generated, so that signals which reach the receive ultrasound transducer 121 before the sound pressure wave may be more accurately identified as false reflections or noise. In an alternative embodiment, a lock out or time out period is initiated by, for example, the digital signal processor 111 to avoid false detection of extraneous signals.

A sound pressure wave received by the receive ultrasound transducer 121 will produce a voltage signal with a frequency and burst length properties related to a transmitted sound pressure wave. The voltage signal is amplified by the receive amplifier 120 before being sent to the analog signal processor 118, which in an alternative embodiment to embodiments having the receive amplifier 120 and the signal processor 118 are combined into a signal processor. The analog signal processor 118 may include, but is not limited to, frequency selective filtering, envelope detection, integration, level comparison and/or analog-to-digital conversion. Based on this disclosure, it should be appreciated that these functions may be separated into individual blocks with some examples being illustrated in later figures. The analog signal processor 118 produces a received signal that represents the received sound pressure wave at the receive ultrasound transducer 121, which in implementation will have a slight delay. The received signal is passed from the analog signal processor 118 to the digital signal processor 111. When transmission time is used, the digital signal processor 111 will stop the counter that is counting pulses from the oscillator 112 when the received signal is received. In such an embodiment, the measured time can be compared to a predetermined value to determine whether a change in focus should occur. In other embodiments, the digital signal processor 111 interprets the received signal for a message from, for example, the other contact lens or an external device. The resulting output from the digital signal processor 111 is provided to the system controller 130.

In at least one embodiment, the counter output is compared to a preset value by the digital signal processor 111. Standard determinations include a counter value greater than, less than, or equal to the preset value. Depending on the relationship between the counter and the preset values, additional signal processing may be performed to improve object distance information acquisition. For example, if the counter value is less than or equal to the preset value, the sampling rate of the ultrasound time-of-flight measurement may be altered to temporarily increase the sampling rate. Each provided sample will have a related counter value to compare to the preset count. If a predetermined number of samples meet the preset requirements, the object is considered stable in the field of view. A variety of target acquisition algorithms are implemented based on the relationship between the counter and the preset values. In a further alternative embodiment, the digital signal processor 111 provides a signal to the system controller 130 which indicates that a target in the field of view is in an accommodation range. The system controller 130 then initiates accommodation in a lens accommodation controller of the actuator 150. The lens accommodation controller activates a lens driver also incorporated in the actuator 150 to change a focus of the electro-active contact lens 100.

Figure 5:
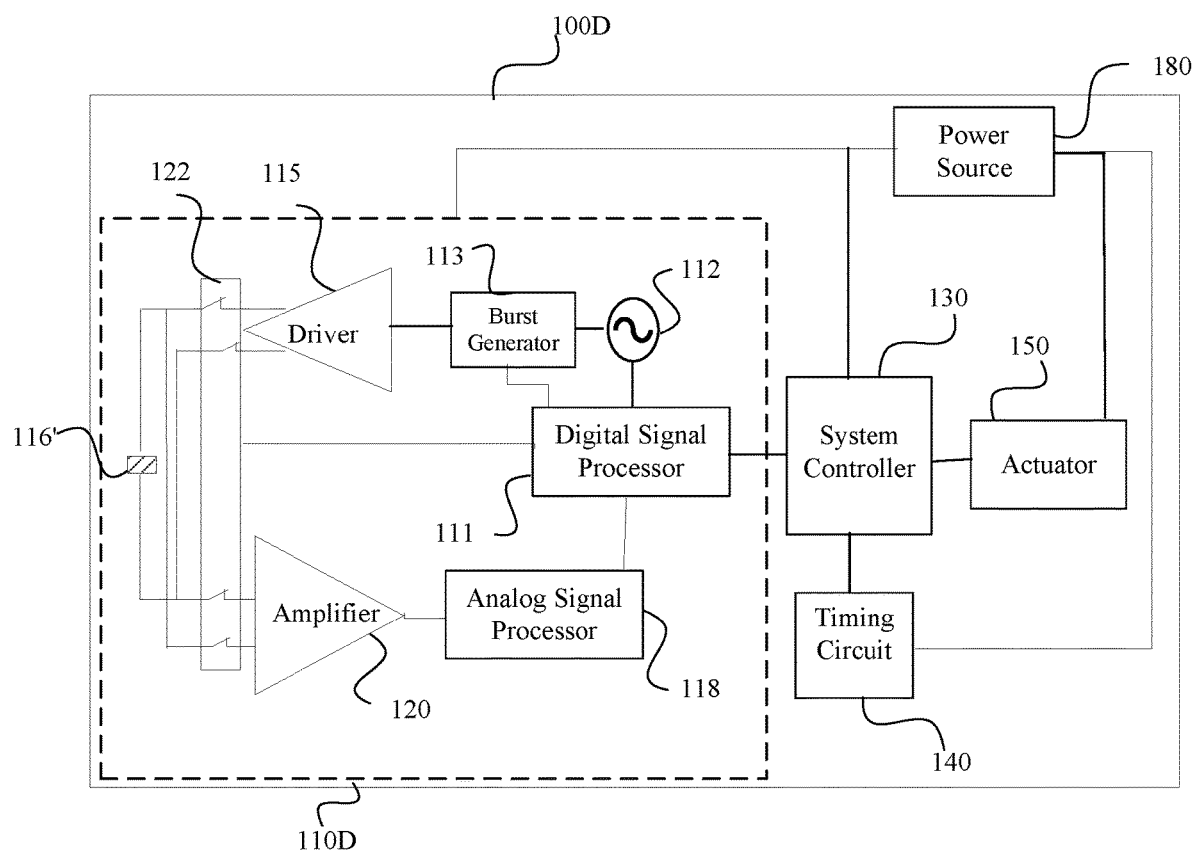
FIG. 5 illustrates an ultrasound module with one transducer and a multiplexer in accordance with at least one embodiment of the present invention.

FIG. 5 illustrates a contact lens 100D with an ultrasound module 110D. The illustrated ultrasound module 110D includes one ultrasound transducer 116' that is shared by the transmit and receive sides (or paths). The single ultrasound transducer 116' is multiplexed between transmit and receive operation through use of a switch 122. The digital signal processor 111D uses the output of the burst generator 113 to switch the transducer 116' to transmit mode by connecting the transmit driver 115 to the transducer 116'. When the burst is completed, then the digital signal processor 111D switches the switch 122 to the receive mode by connecting the receive amplifier 120 to the transducer 116'. One advantage to this configuration is that the transducer area is reduced from two transducers to one transducer, but a drawback to this configuration is that a short time of flight may not be detected or if the ultrasound module 110D is being used for communication, then a received communication may be missed during a transmission or vice versa. As with the previous embodiment, a delay may be imposed after transmission before the receive amplifier 120 is powered. The remaining components of the illustrated embodiment remain the same from the prior embodiment.

Figure 6:
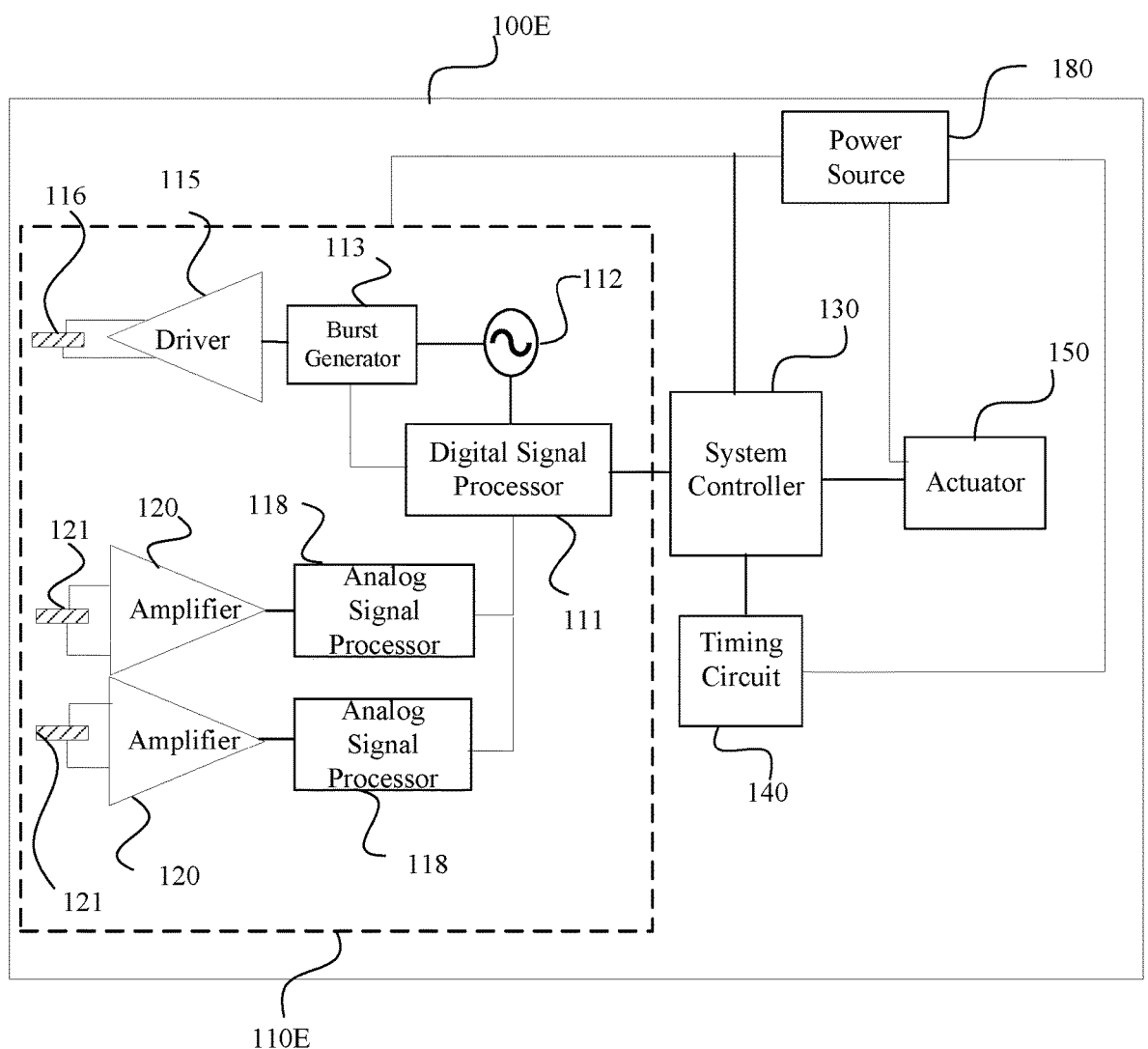
FIG. 6 illustrates an ultrasound module with two receive transducers in accordance with at least one embodiment of the present invention.

FIG. 6 illustrates a contact lens 100E where the receive side of the ultrasound module 110E includes two receive paths, which may be implemented in the other embodiments. One advantage to this configuration is that the transducers could be configured for different sound frequencies to match the frequency of the sound pressure waves of the same contact lens and the second receive path to match the frequency of the sound pressure waves of the other contact lens. A similar approach may be adopted in the other embodiments where the receive transducer matches the frequency of the transmit transducer of the other contact lens. Each of the receive paths include a receive ultrasound transducer 121 electrically connected to a receive amplifier 120, which is electrically connected to an analog signal processor 118. The analog signal processors 118 are electrically connected to the digital signal processor 111. This approach also would allow for communication between the contact lenses and the separation of frequencies allows for distinguishing the source contact lens. In an alternative embodiment, the second receive path is omitted.

Figure 7:
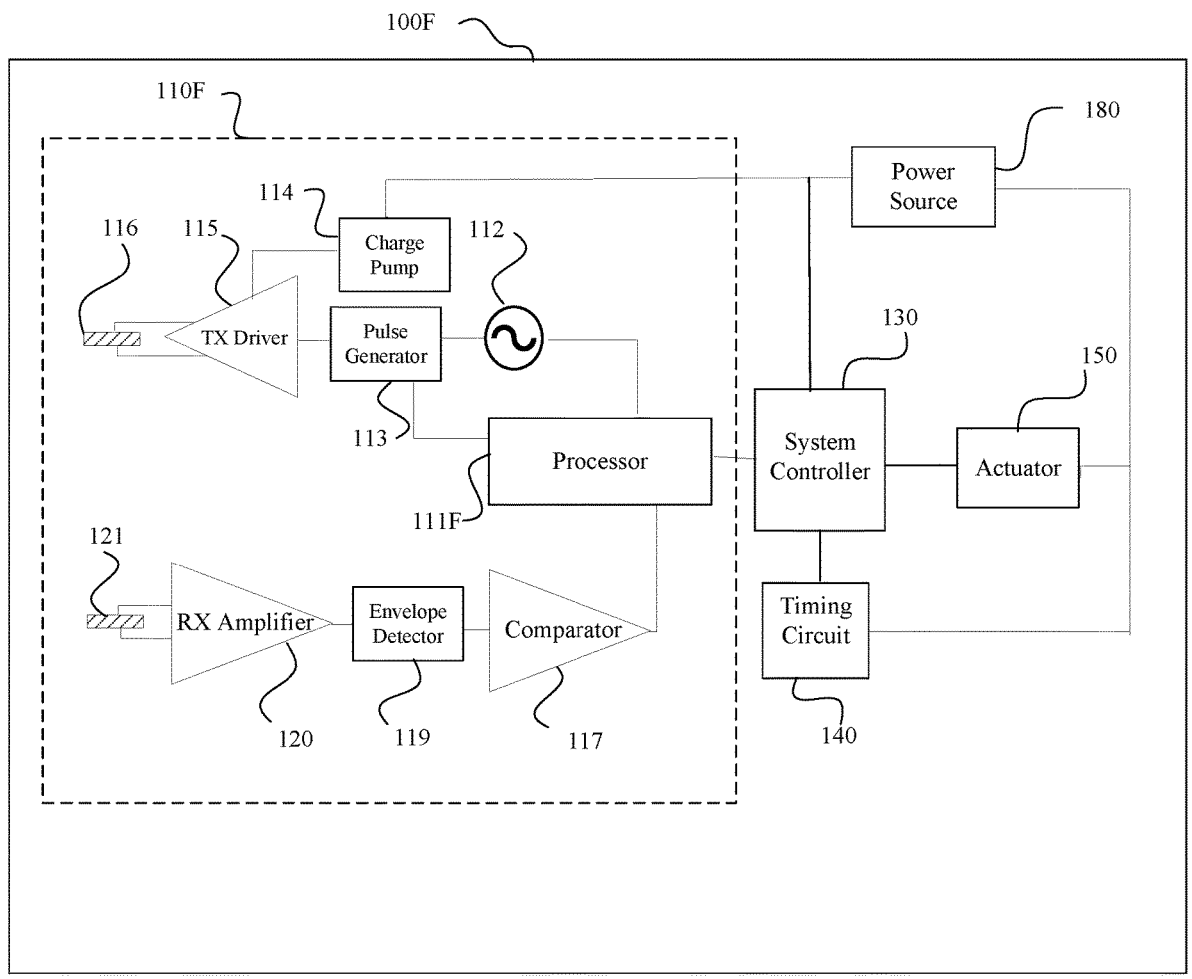
FIG. 7 illustrates an ultrasound module with two transducers, a charge pump and an envelope detector in accordance with at least one embodiment of the present invention.

FIG. 7 illustrates a contact lens 100F with an ultrasound module 110F. The illustrated ultrasound module 110F includes a processor 111F, the oscillator 112, the pulse generator 113, a charge pump 114, the transmit driver 115, the transmit ultrasound transducer 116, a comparator 117, an envelope detector 119, the receive amplifier 120, and the receive ultrasound transducer 121. The charge pump 114 is electrically connected to the power source 180 and to the transmit driver 115, which provides a voltage to the transmit ultrasound transducer 116 to create the sound pressure wave to be emitted by the transducer 116. In at least one embodiment, the transmit driver 115 includes an inverter or an H-bridge, and in further embodiments includes an output driver circuit. In at least one embodiment, the charge pump 114 increases the voltage through the relationship between charge and capacitance with voltage by increasing the charge on a capacitance component(s) (e.g., a capacitor). The voltage output from the charge pump 114, in at least one embodiment, is used as the supply voltage to the transmit driver 115. The transmit driver 115 switches between the output of the charge pump 114 and ground in an alternating fashion in response to the input from the pulse generator 113 to produce an alternating voltage. The alternating voltage is applied by the driver 115 to polarize the material of the transducer 116 in one direction and then the other direction to create a mechanical stress causing the material to be displaced in a specific direction (i.e. the direction the transducer is facing). The displacement of the transducer material coupled with the shape and the size of the transducer produce the sound pressure wave. Thus, the larger the applied voltage is to the transducer, the larger the stress and thus the larger the displacement and associated sound pressure wave.

The charge pump 114 is also electrically connected to the processor 111F, which controls operation of the charge pump 114 in at least one embodiment to minimize power consumption by the system by, for example, turning off the oscillator 112, the pulse generator 113, and/or the charge pump 114 at times when the ultrasound module 110F does not need to propagate a sound pressure wave. The envelope detector 119 turns the high-frequency output of the receive ultrasound transducer 121 into a new signal that provides an envelope signal representative of the original output signal to be provided to the comparator 117. This illustrated embodiment has the advantage of simplifying the analysis of the output of the receive ultrasound transducer 121 to determine if a particular threshold has been met for the contact lens 100F to perform a function. The comparator 117 provides an output to the processor 111F, which is in electrical communication with the system controller 130.

Figure 8:
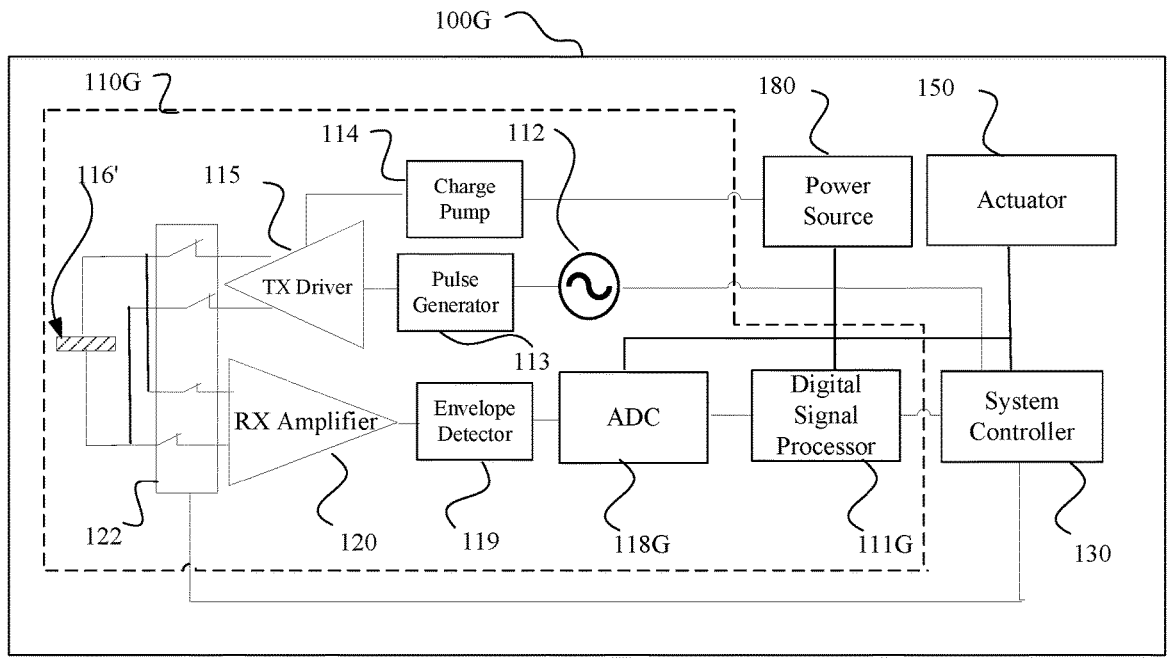
FIG. 8 illustrates an ultrasound module with one transducer and a multiplexer in accordance with at least one embodiment of the present invention.

FIG. 8 illustrates a contact lens 100G with an ultrasound module 110G. The illustrated ultrasound module 110G includes a digital signal processor 111G, the oscillator 112, the pulse generator 113, the charge pump 114, the transmit driver 115, the transmit/receive ultrasound transducer 116', an analog-to-digital converter (ADC) 118G, an envelope detector 119, the receive amplifier 120, and the switch 122. The ADC 118G converts the output from the envelope detector 119 into a digital signal for the digital signal processor 111G.

Figure 9:
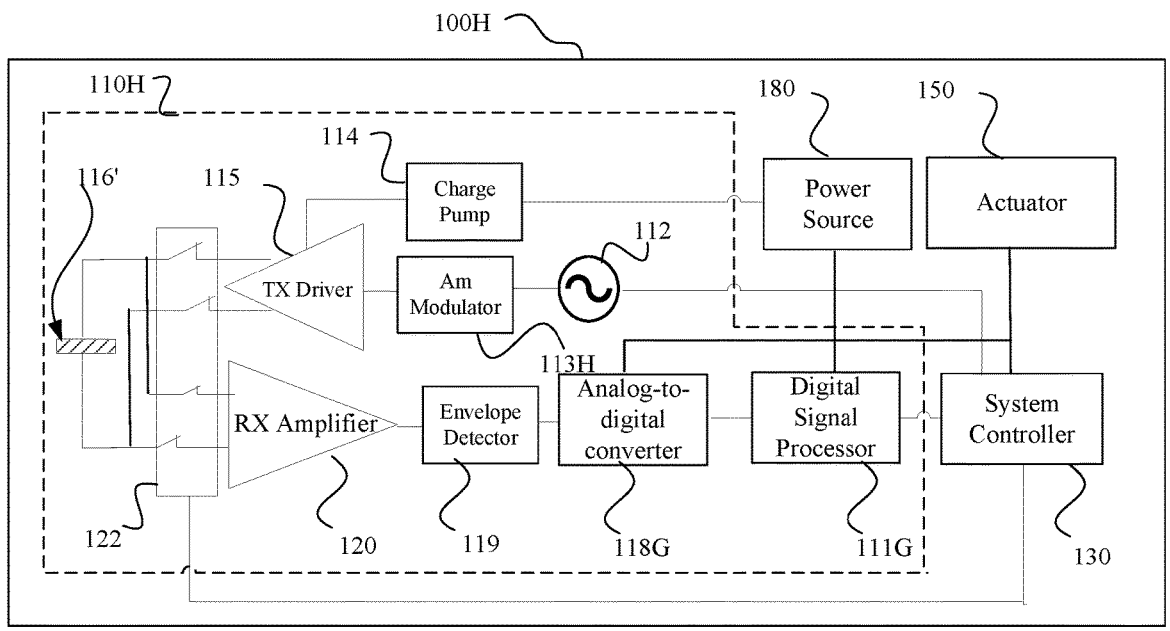
FIG. 9 illustrates an ultrasound module with one transducer and a multiplexer in accordance with at least one embodiment of the present invention.

FIG. 9 illustrates a contact lens 100H with an ultrasound module 110H. The illustrated ultrasound module 110H includes a digital signal processor 111G, the oscillator 112, an amplitude modulation (AM) modulator 113H, the charge pump 114, the transmit driver 115 such as a transmit amplifier, the transmit/receive ultrasound transducer 116', an analog-to-digital converter (ADC) 118G, an envelope detector 119, the receive ultrasound transducer 121, and the switch 122. In the illustrated embodiment, the charge pump 114, the AM modulator 113H and transmit driver 115 act as the level shifter and the burst generator. The AM modulator 113H in this embodiment is controlled by the digital signal processor 111G. The circuit works where the oscillator signal is provided to the AM modulator 113H, which in at least one embodiment is an AND gate, and the digital signal processor 111G provides a second clock at a frequency much lower than the oscillator frequency. The output of the circuit is then a sequence of pulses that occur during the positive cycle of the lower frequency. The transmit driver 115 has the appropriate gain to output the modulated signal at the charge pump voltage thus providing level shifting.

Based on the disclosure connected to FIGS. 7-9, one of ordinary skill in the art should appreciate that the different ultrasound module configurations and transducer/switch configurations may be interchanged and mixed together in different combinations.

Figure 10:
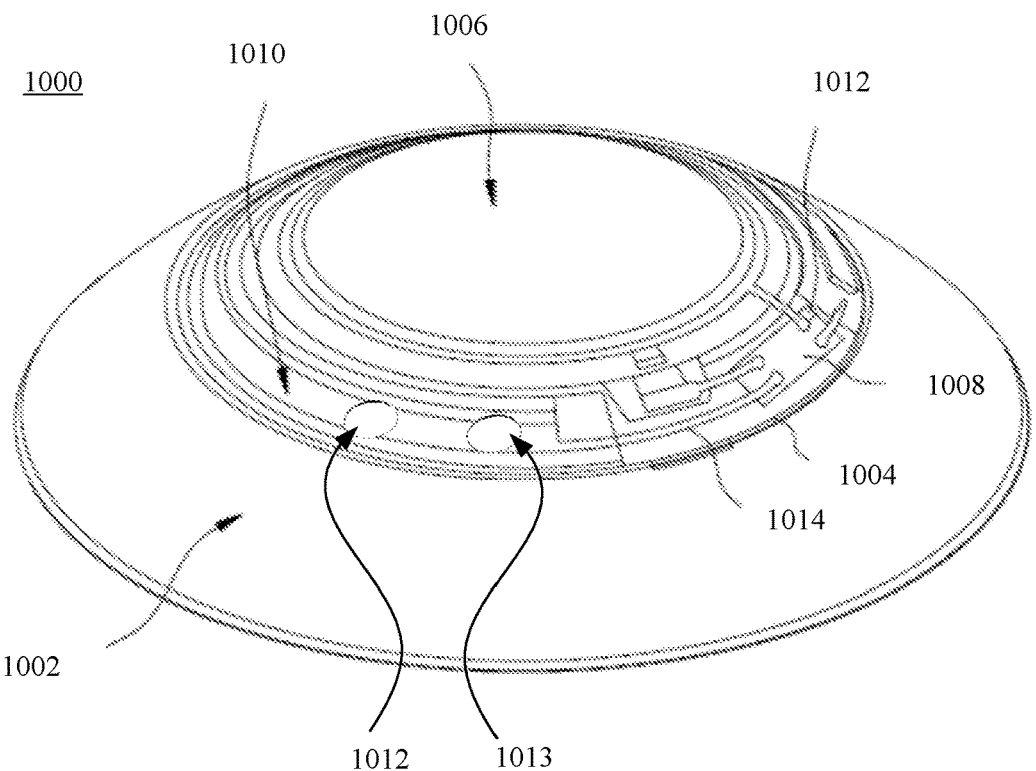
FIG. 10 illustrates a diagrammatic representation of an electronic insert, including a pair of transducers, for a powered contact lens in accordance with at least one embodiment of the present invention.

FIG. 10 illustrates a contact lens 1000 with an electronic insert 1004 having an ultrasound module. The contact lens 1000 includes a soft plastic portion 1002 which houses the electronic insert 1004, which in at least one embodiment is an electronics ring around a lens 1006. This electronic insert 1004 includes the lens 1006 which is activated by the electronics, for example, focusing near or far depending on activation (or accommodation level). In at least one embodiment, the electronic insert 1004 omits the adjustability of the lens 1006. Integrated circuit 1008 mounts onto the electronic insert 1004 and connects to batteries (or power source) 1010, lens 1006, and other components as necessary for the system.

In at least one embodiment, a transmit ultrasound transducer 1012 and a receive ultrasound transducer 1013 are present in the ultrasound module. In at least one embodiment, the integrated circuit 1008 includes a transmit ultrasound transducer 1012 and a receive ultrasound transducer 1013 with the associated signal path circuits. The transducers 1012, 1013 face outward through the lens insert and away from the eye (i.e., front-facing), and is thus able to send and receive sound pressure waves. In at least one embodiment, the transducers 1012, 1013 are fabricated separately from the other circuit components in the electronic insert 1004 including the integrated circuit 1008. In this embodiment, the transducers 1012, 1013 may also be implemented as separate devices mounted on the electronic insert 1004 and connected with wiring traces 1014. Alternatively, the transducers 1012, 1013 may be implemented as part of the integrated circuit 1008 (not shown). Based on this disclosure one of ordinary skill in the art should appreciate that transducers 1012, 1013 may be augmented by the other sensors.

Figure 11:
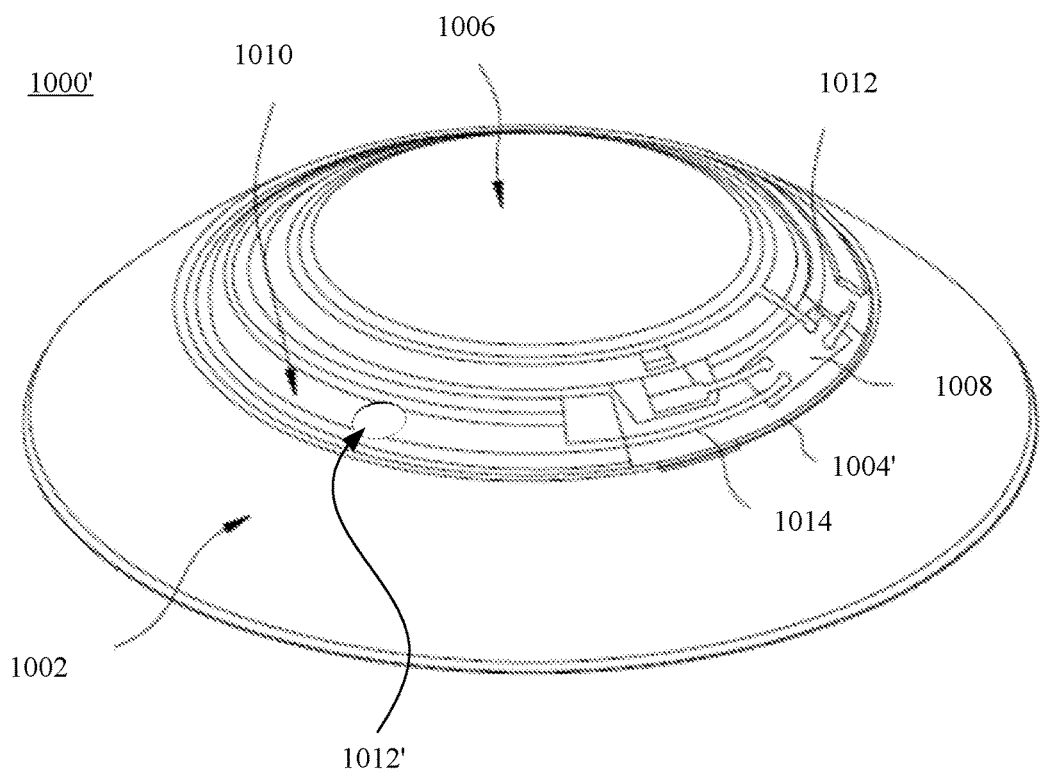
FIG. 11 illustrates a diagrammatic representation of an electronic insert, including a transducer, for a powered contact lens in accordance with at least one embodiment of the present invention.

FIG. 11 illustrates another contact lens 1000' with an electronic insert 1004' having an ultrasound module. The contact lens 1000' includes a soft plastic portion 1002 which houses the electronic insert 1004'. This electronic insert 1004' includes a lens 1006 which is activated by the electronics, for example, focusing near or far depending on activation (or accommodation level). In at least one embodiment, the electronic insert 1004' omits the adjustability of the lens 1006. Integrated circuit 1008 mounts onto the electric insert 1004' and connects to batteries (or power source) 1010, lens 1006, and other components as necessary for the system. The ultrasound module includes a transmit/receive ultrasound transducer 1012' with the associated signal path circuits. The transducer 1012' faces outward through the lens insert and away from the eye, and is thus able to send and receive sound pressure waves. As discussed above, the transducer 1012' may be fabricated separately from the other electronic components prior to mounting on the electronic insert 1004 or alternatively implemented on the integrated circuit 1008 (not shown). The transducer 1012' may also be implemented as a separate device mounted on the electronic insert 1004' and connected with wiring traces 1014. Based on this disclosure one of ordinary skill in the art should appreciate that transducer 1012' may be augmented by the other sensors.

In a further embodiment to the embodiments illustrated in FIGS. 10 and 11, the integrated circuit 1008, the power source 1010 and the transducers 1012, 1012', 1013 are present in an area of the contact lens contained in an overmold, which is a material (such as plastic or other protective material) encapsulating the electronic insert 1004. In at least one further embodiment, the overmold encapsulates the ultrasound module(s).

Figure 12:
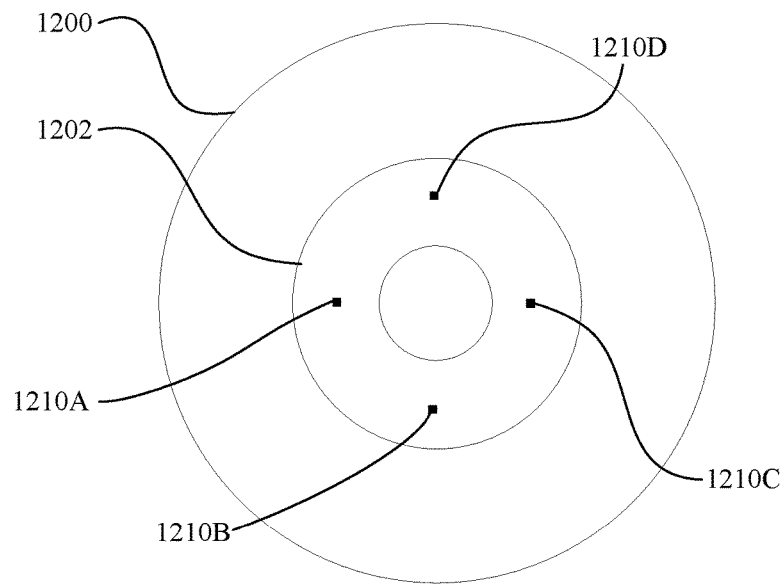
FIG. 12 illustrates a diagrammatic representation of evenly spaced ultrasound modules/transducers in accordance with at least one embodiment of the present invention.

In at least one embodiment as illustrated in FIG. 12 (omits the other components to facilitate presentation clarity), there are a plurality of ultrasound modules 1210A-1210D spaced around the contact lens 1202 on the eye 1200 to increase the fidelity of the distance measurements. Although four ultrasound modules 1210A-1210D are illustrated, it should be appreciated based on this disclosure that a variety of numbers of ultrasound modules may be used with example numbers of ultrasound modules being any number between 2-8, a plurality of ultrasound modules, and at least one ultrasound module. The illustrated ultrasound modules 1201A-1210D are evenly spaced around the periphery of the contact lens 1202 where evenly spaced includes equal distance between the ultrasound modules (i.e., the same distance between neighboring ultrasound modules) and/or balanced about a diameter drawn through the contact lens 1202.

Figure 13:
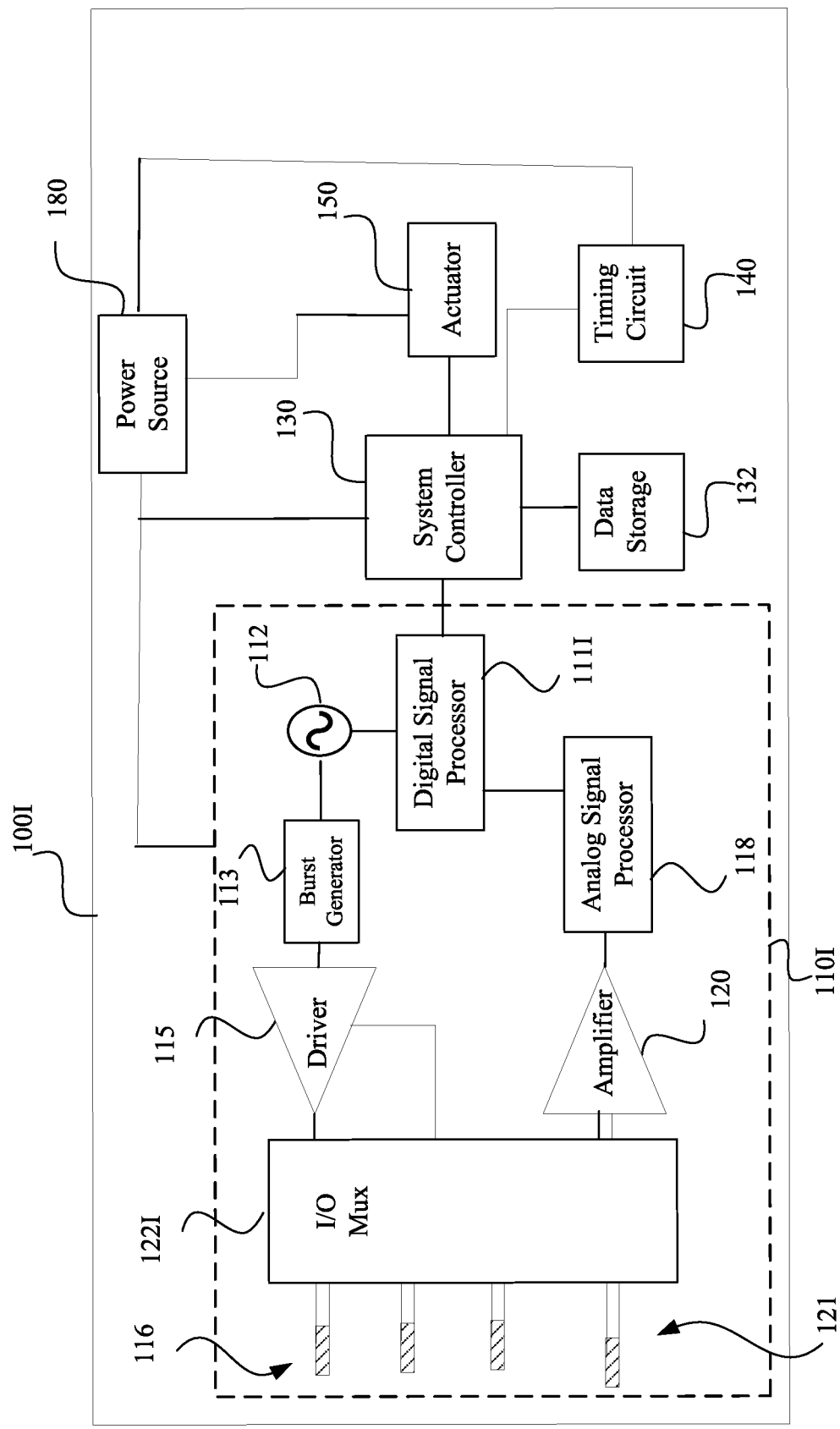
FIG. 13 illustrates an ultrasound module with a plurality of transmit/receive transducer pairs or transceiver transducers in accordance with at least one embodiment of the present invention.

In at least one embodiment, the system controller deactivates the transmission components of the ultrasound module when the respective contact lens is not transmitting. In a further embodiment, the illustrated ultrasound modules are replaced by transducers that are multiplexed together as illustrated in FIG. 13. In a further embodiment for contact lenses that have a plurality of ultrasound modules or at least a plurality of transmit/receive/transceiver transducers, the method includes having the system controller determine which ultrasound module/transducer provides the best response. The system controller selects the ultrasound module/transducer that produces a highest output response to reflected sound pressure waves. The system controller will deactivate the ultrasound module(s)/transducer(s) that were not selected (i.e., provided a lower signal strength). One benefit to this method is that as the contact lens rotates on the eye, the system controller can change the used ultrasound module/transducer to avoid any ultrasound module/transducer covered by an eyelid and/or for intra-contact communication.

In an alternative embodiment illustrated in FIG. 13, the contact lens 100I has one ultrasound module 110I having a plurality of transducers 116, 121 and an I/O multiplexer (mux) 1221 attaching the transducers 116, 121 to the ultrasound module components discussed in the above embodiments. FIG. 13 illustrates the inclusion of the digital signal processor 111, the oscillator 112, the burst generator 113, the driver 115, the amplifier 120, and the analog signal processor 118. In alternative embodiment, these ultrasound module components may be replaced by components from the other described ultrasound module embodiments including using just the transmit or receive paths of those embodiments. An advantage of this configuration is that it reduces the power requirements and weight considerations by eliminating duplicative components and allowing the ultrasound module to drive multiple transmit transducers and to receive analog signals from multiple receive transducers. In at least one embodiment, the transmit transducers and the receive transducers are distributed about the contact lens as discussed above in connection with FIG. 12. In a further embodiment, the transmit transducers and the receive transducers are grouped together in one area of the contact lens.

In a further embodiment, the sound pressure waves produced by the first and second contact lenses are at different frequencies such as the first contact lens using a first frequency and the second contact lens using a second frequency. The ultrasound module in at least one embodiment then is tuned for the frequency of the output sound pressure wave produced by the that contact lens. An advantage of this is that it improves each receiver's capability of correctly detecting the desired signal. By using separate frequencies, frequency selective techniques (such as mixing and envelope detection) can reject noise or undesired transmit signals that could be produced by the physical geometry and properties of the communication channel through unwanted scattering, for example, from the nose.

Figure 14:
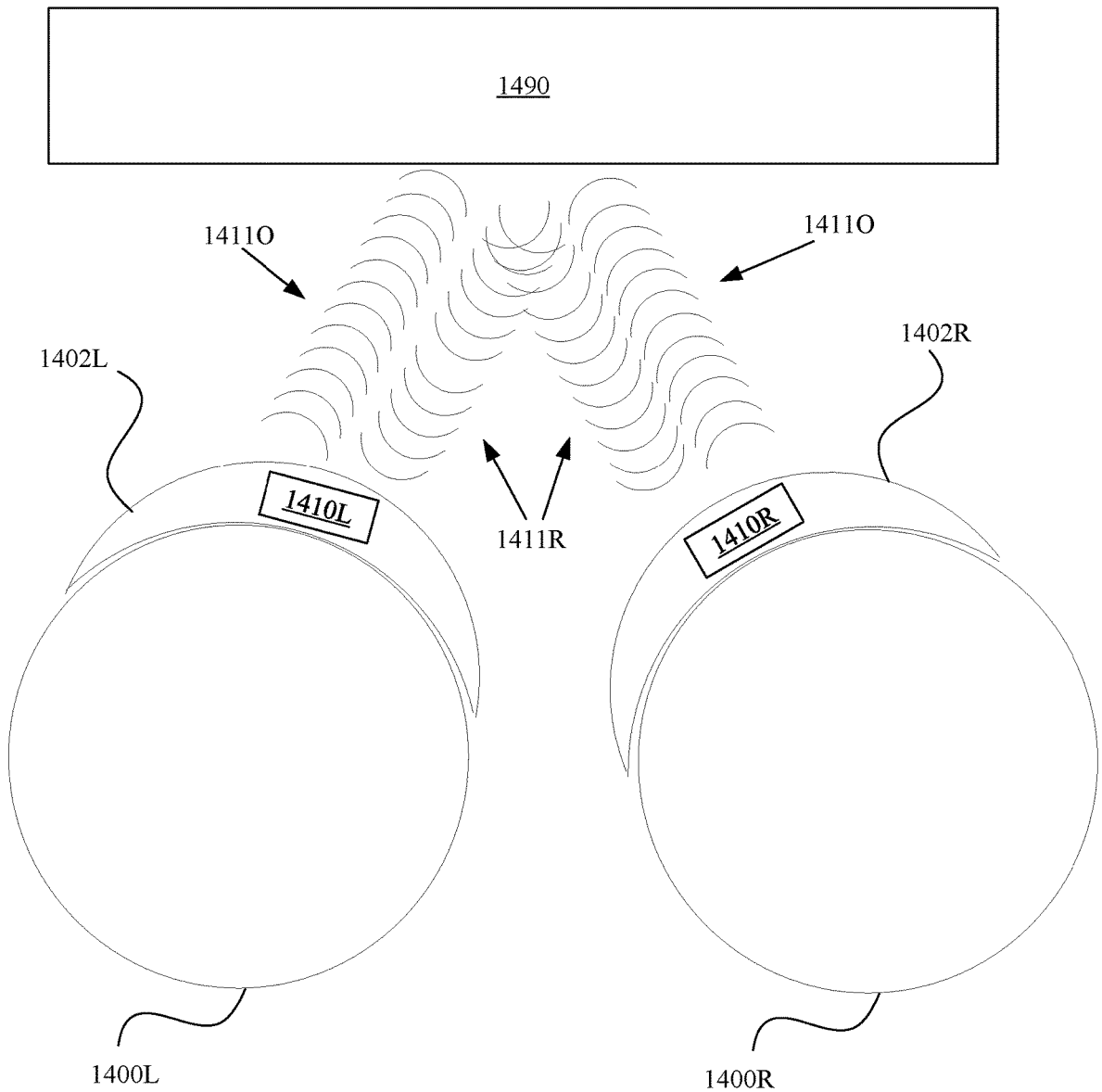
FIG. 14 illustrates a diagrammatic representation of a pair of transducers emitting and receiving sound pressure waves in accordance with at least one embodiment of the present invention.

FIG. 14 illustrates a pair of contact lenses 1402L, 1402R on a pair of eyes 1400L, 1400R. The illustrated contact lenses 1402L, 1402R include a simplified illustration with just the transducers 1410L, 1410R being illustrated and representative of the transducers discussed in this disclosure. The illustrated transducers 1410L, 1410R are emitting sound pressure waves 14110 towards an object 1490 being viewed that is reflecting sound pressure waves 1411R that are then received at the transducers 1410L, 1410R.

Figure 16:
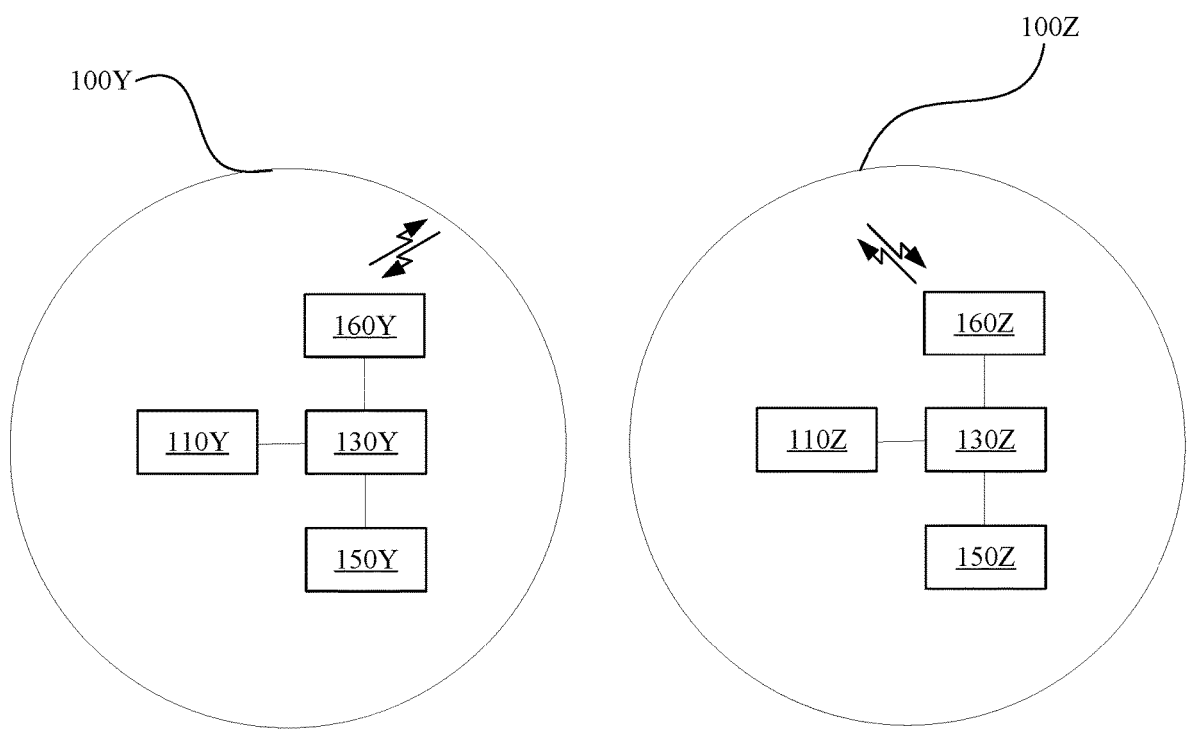
FIG. 16 illustrates a diagrammatic representation of two contact lenses each having a communications module for communication between them in accordance with at least one embodiment of the present invention.
Figure 15:
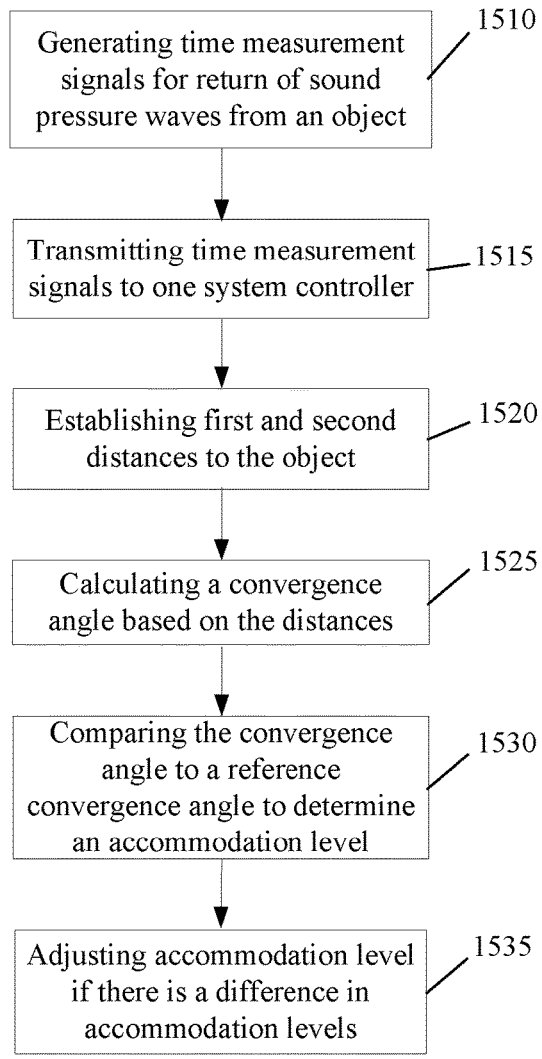
FIG. 15 illustrates a method of measuring a convergence angle between a left eye and a right eye in accordance with at least one embodiment of the present invention.

FIG. 15 illustrates a method for determining an accommodation threshold distance using a convergence angle between a left eye and a right eye. Accommodation activation based on line of sight convergence is determined using a pair of contact lenses 100Y, 100Z (illustrated in FIG. 16) configured to determine distance to an object. In at least one embodiment, similar methods can be used for implanted intraocular lenses during use.

Time measurement signals (or time-of-flight measurement signals) are generated at least in part by at least one ultrasound module 130 on each contact lens 110, 1510. In an alternative embodiment, the time measurement signal represents a distance.

The time measurement signals are transmitted to the system controller 130 on one of the contact lenses 100Y/100Z, for example, the system controller 130 on the second contact lens 100 (this example will be used to discuss the method illustrated in FIG. 15, but one of ordinary skill in the art should appreciate based on this disclosure that the first and second contact lenses could be switched or an external device could be used to perform the processing discussed in this method), 1515. In the example, the ultrasound module 110Z on the second contact lens 100Z sends the time measurement signal to the system controller 130Z and the ultrasound module 110Y on the first contact lens 100Y sends its time measurement signal to the system controller 130Y that sends the time measurement signal over a communications link 165 to the system controller 130Z on the second contact lens 100Z. As discussed previously, the communications link 165 may be established using the ultrasound module(s) 130 or a communications module 160.

The system controller 130Z establishes a first distance A to an object from the first contact lens 100Y and a second distance B to the object from the second contact lens 100Z, 1520. The system controller 130Z calculates a convergence angle using a contact lenses separation distance C and the first and second distances A, B, 1525.

Figure 17:
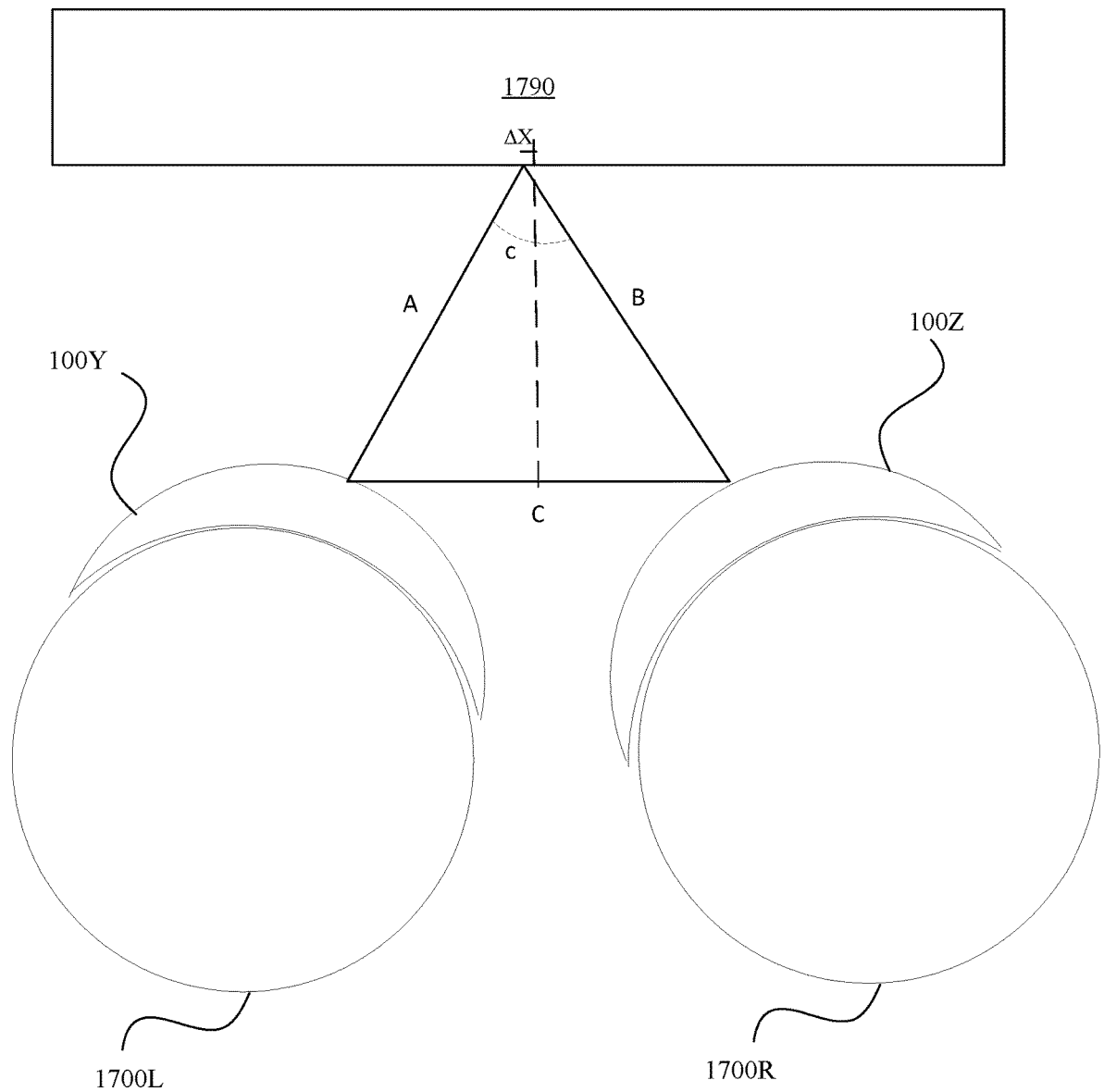
FIG. 17 illustrates a diagrammatic representation of a pair of contact lenses and distances in accordance with at least one embodiment of the present invention.

FIG. 17 illustrates a relationship between measured distances A, B from the eyes 1700L, 1700R to the object 1790 and the distance C between the eyes 1700L, 1700R. Using the first and second distance measurements A, B as well as a known distance between the eyes (or at least a rough approximation based on, for example, sizing or population data) C, the convergence angle c can be calculated using geometric relationships between each of the three distances. Specifically, triangle ABC is defined by the geometry between the object and the left and right eyes 1700L, 1700R. For each distance Y and offset ΔX, which is the distance along a line parallel to a line between the eyes measured from a line that bisects the eye line, there are lines of distance A and B which can be drawn to the object. The intersection of these lines at the object 1790 creates angle c, which is referred to as the convergence angle. For varying values of ΔX, the convergence angle generally includes a narrow range of allowed values. The system controller then is able to determine the convergence angle c based on the lengths of A, B, and C (assuming A and B are intersecting or close to intersecting) where $$c=\cos^{+1}(A^2+B^2+C^2).$$

The system controller 130Z compares the convergence angle c to a reference convergence angle to determine an accommodation level, 1530.

The system controller 130Z initiates the actuators 150Y, 150Z to adjust a focus of the contact lenses 100Y, 100Z when the accommodation level is different than a current accommodation level of the contact lenses, 1435. One way to accomplish this is by having the system controller 130Z send an initiation signal to the actuator 150Z to change the accommodation level on the second contact lens 100Z and also send (or alternatively send a separate signal) to the system controller 130Y on the first contact lens 100Y to have that system controller initiate an accommodation change on the first contact lens 100Y through its actuator 150Y. Alternatively, the system controller 130Z may send a signal to the actuator 150Y through the communications link 165 and bypass the system controller 130Y on the first contact lens 100Y.

In an alternative embodiment, the value of the convergence angle c is compared to a convergence angle for the accommodation threshold distance to activate a corresponding accommodation state for each of the contact lenses 100 when the convergence angle has crossed the accommodation threshold distance. In at least one embodiment, the measured convergence angle c must stay on one side of the accommodation threshold distance for a predetermined number of samples and/or time to avoid disruptive accommodation changes when not desired. In an alternative embodiment, the convergence angle c needs to stay within an angle threshold over at least five samples.

In at least one embodiment, the corresponding accommodation state of each lens 100 is generally dependent upon the relationship between the measured convergence angle c and a preset convergence angle. The preset convergence angle may be programmed, obtained through calibration, or determined by adaptive target processing. Current studies indicate that accommodation activation for each lens 100 may be separated in time by as much as 500 ms before adjustments in focus become noticeable to the user. Accordingly, use of dual ultrasound time-of-flight systems paired by a communication link provides a convergence detector system having functionality beyond that of independent operation of each contact lens 100.

Figure 18:
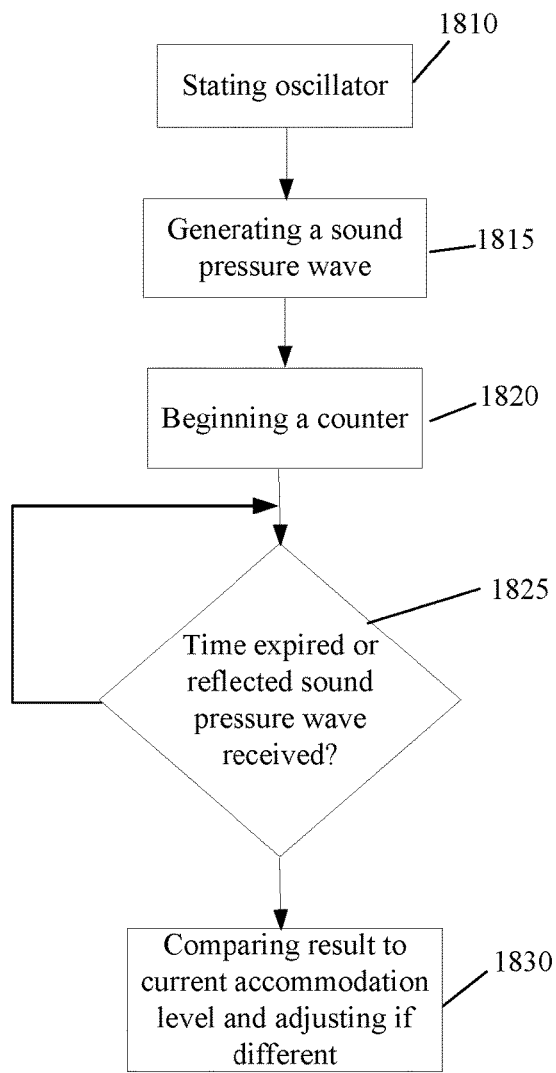
FIG. 18 illustrates a method for measuring distance in accordance with at least one embodiment of the present invention.

FIG. 18 illustrates an alternative method for adjusting accommodation of the contact lenses 100 based on the time of flight of the sound pressure wave and the reflection of the sound pressure wave. The system controller has the ultrasound module activate including starting the oscillator (and/or other timing circuit), 1810. The ultrasound module generates a sound pressure wave or a burst of sound pressure waves from the transducer into the field of view, 1815. Approximate generation of the sound pressure wave, a counter begins, 1820. The ultrasound module waits for until the earlier of receiving a reflected sound pressure wave or burst and the counter reaching a predetermined time, 1825. In at least one embodiment, the predetermined time is in excess of the time of flight to change accommodation from distance viewing to a closer level of viewing. When the result of the time measurement is on the opposite side of the accommodation threshold of the current accommodation level, the system controller signals an actuator or other lens controller to change accommodation, 1830. Depending upon the implementation, the ultrasound module or the system controller would perform the determination of when there is a change in accommodation. In an alternative embodiment, the decision is made after at predetermined number of samples that all confirm that a change is to occur. In at least one embodiment, the number of samples is any number between 2 and 10 and more particularly 5 samples. In a further embodiment, the rate of sampling may increase when a change is detected and/or conversely after an accommodation is changed, the sampling rate is decreased for a period of time. In at least one embodiment, the contact lenses operate independently of each other. In other embodiments, the contact lenses communicate with each other to confirm the accommodation level to use.

In at least one embodiment, there are multiple accommodation levels with different accommodation threshold distances to allow for multiple levels of focus over the wearer's field of vision. The system controller 130 would select the accommodation level based on the distance to the object and/or the time of flight to the object. In an alternative embodiment, the furthest accommodation threshold distance would be based on the expiration of a time limit and would not require the receipt of a reflected sound pressure wave.

Although shown and described in what is believed to be the most practical embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. An ophthalmic lens system comprising:
a first ophthalmic lens; and
a second ophthalmic lens;
each of said first ophthalmic lens and said second ophthalmic lens including:
at least one ultrasound module configured to generate a time of flight measurement signal;

a system controller electrically connected to said ultrasound module, said system controller configured to activate said ultrasound module using at least one preselected sampling frequency; and a communications module in electrical communication with at least one of said ultrasound module or said system controller, said communications module configured to establish a communications link with said other ophthalmic lens;

wherein said communications module of said first ophthalmic lens is in signal communication with said communications module of said second ophthalmic lens during use;

wherein said system controller of said first ophthalmic lens receives the time of flight measurement signal generated by at least one ultrasound module on each ophthalmic lens, the time of flight measurement signals defining respective first and second distances to an object from each of said first ophthalmic lens and said second ophthalmic lens, wherein the respective first and second distances are used by said system controller of said first ophthalmic lens in combination with an ophthalmic lens separation distance to establish a convergence angle for setting an accommodation level of said first ophthalmic lens and said second lens; and wherein said system controller on said first ophthalmic lens sets an accommodation level after at least five convergence angles have been established and maintained an angle within a predetermined angle threshold.

2. The ophthalmic lens systems according to claim 1, wherein said first ophthalmic lens is a first contact lens and said second ophthalmic lens is a second contact lens.

3. The ophthalmic lens system according to claim 1, wherein each ophthalmic lens further includes an actuator electrically connected to said system controller on said ophthalmic lens to adjust a focus of said ophthalmic lens based on the accommodation level setting.

4. A method for operation of a first ophthalmic lens and a second ophthalmic lens, each of the first ophthalmic lens and the second ophthalmic lens including an ultrasound module, a system controller, a communications module, and an actuator, the method comprising:

generating the first and second time measurement signals respectively by the ultrasound modules of each ophthalmic lens;

transmitting the first and second time measurement signals to the system controller of the second ophthalmic lens;

establishing respective first and second distances to an object from each of the ophthalmic lenses using the first and second time measurement signals by the system controller of the second ophthalmic lens;

calculating a convergence angle using a ophthalmic lens separation distance and the respective first and second distances to the object by the system controller of the second ophthalmic lens;

the steps of repeating generating, transmitting, establishing, and calculating a plurality of times to confirm that the convergence angle remains within a predefined range;

comparing the convergence angle to a reference convergence angle to establish an accommodation level; and initiating the actuators to adjust a focus of the ophthalmic lenses when the accommodation level is different than a current accommodation level of the ophthalmic lenses.

5. The method according to claim 4, further comprising calibrating the reference convergence angle of the ophthalmic lenses based on the first and second distances to an object held during the calibration of the first ophthalmic lens and the second ophthalmic lens.

* * * * *